(12) United States Patent
Yamamoto et al.

(10) Patent No.: US 10,734,654 B2
(45) Date of Patent: Aug. 4, 2020

(54) SECONDARY BATTERY AND SECONDARY BATTERY MANUFACTURING METHOD

(71) Applicant: TOYOTA JIDOSHA KABUSHIKI KAISHA, Toyota-shi, Aichi-ken (JP)

(72) Inventors: Satomi Yamamoto, Miyoshi (JP); Mizuho Matsumoto, Toyota (JP); Hiroshi Takamatsu, Moriguchi (JP); Hiroaki Imanishi, Moriguchi (JP); Ichiro Murata, Settsu (JP); Kiyomi Kozuki, Moriguchi (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 130 days.

(21) Appl. No.: 15/887,482

(22) Filed: Feb. 2, 2018

(65) Prior Publication Data
US 2018/0226653 A1 Aug. 9, 2018

(30) Foreign Application Priority Data

Feb. 6, 2017 (JP) .................................. 2017-019425
Mar. 14, 2017 (JP) .................................. 2017-048305

(51) Int. Cl.
*H01M 4/66* (2006.01)
*H01M 2/06* (2006.01)
(Continued)

(52) U.S. Cl.
CPC ......... *H01M 4/661* (2013.01); *B23K 11/0026* (2013.01); *B23K 26/0869* (2013.01);
(Continued)

(58) Field of Classification Search
CPC ............ H01M 2/06; H01M 2/25; H01M 2/30; H01M 2/0469; H01M 10/0525; H01M 4/661; B23K 11/0026
See application file for complete search history.

(56) References Cited

U.S. PATENT DOCUMENTS

2005/0277022 A1* 12/2005 Kozuki ................. H01M 2/263
429/211
2007/0117009 A1 5/2007 Yamauchi et al.
(Continued)

FOREIGN PATENT DOCUMENTS

CN 102148394 A 8/2011
JP 10-106536 A 4/1998
(Continued)

*Primary Examiner* — Bethany L Martin
(74) *Attorney, Agent, or Firm* — Sughrue Mion, PLLC

(57) ABSTRACT

A secondary battery includes: an electrode body including an electrode main body, a collector foil protrusion section, and a collector foil connection portion; a first collector terminal including a first extension part that is welded to the collector foil connection portion; and a second collector terminal that is a member separate from the first collector terminal and includes a second extension part welded to the collector foil connection portion. The first extension part and the second extension part are located on the opposite sides of the collector foil connection portion. The secondary battery includes a welded joint at which both the first extension part and the second extension part are welded to the collector foil connection portion such that the first extension part, the second extension part, and the collector foil connection portion are united. The first collector terminal and the second collector terminal are united through the welded joint.

14 Claims, 14 Drawing Sheets

(51) Int. Cl.

| | | |
|---|---|---|
| *H01M 2/26* | (2006.01) | |
| *H01M 2/04* | (2006.01) | |
| *B23K 11/00* | (2006.01) | |
| *B23K 26/32* | (2014.01) | |
| *B23K 26/08* | (2014.01) | |
| *B23K 26/242* | (2014.01) | |
| *H01M 2/22* | (2006.01) | |
| *H01M 10/0525* | (2010.01) | |
| *H01M 2/30* | (2006.01) | |
| *B23K 103/10* | (2006.01) | |
| *B23K 101/18* | (2006.01) | |
| *B23K 103/12* | (2006.01) | |
| *B23K 101/36* | (2006.01) | |

(52) U.S. Cl.
CPC .......... *B23K 26/242* (2015.10); *B23K 26/32* (2013.01); *H01M 2/0469* (2013.01); *H01M 2/06* (2013.01); *H01M 2/22* (2013.01); *H01M 2/26* (2013.01); *H01M 2/266* (2013.01); *B23K 2101/18* (2018.08); *B23K 2101/36* (2018.08); *B23K 2103/10* (2018.08); *B23K 2103/12* (2018.08); *H01M 2/30* (2013.01); *H01M 10/0525* (2013.01)

(56) References Cited

U.S. PATENT DOCUMENTS

| | | | |
|---|---|---|---|
| 2011/0195286 A1 | 8/2011 | Aota et al. | |
| 2013/0196229 A1* | 8/2013 | Shiraishi | H01G 9/008 |
| | | | 429/211 |
| 2018/0287124 A1* | 10/2018 | Kambayashi | H01G 9/0029 |

FOREIGN PATENT DOCUMENTS

| | | |
|---|---|---|
| JP | 2007-149353 A | 6/2007 |
| JP | 2011-165437 A | 8/2011 |
| JP | 2013-179015 A | 9/2013 |
| JP | 2016-225117 A | 12/2016 |

* cited by examiner

| | CONDITIONS | EVALUATION 1 | EVALUATION 2 |
|---|---|---|---|
| | FORM OF COLLECTOR TERMINAL BEFORE WELDING | VISUAL OBSERVATION OF COLLECTOR FOIL AS INSERTED IN SLIT | VISUAL OBSERVATION OF WELDED JOINT AS BROKEN UP |
| COMPARATIVE EXAMPLE 1 | ONE-PIECE, WITH 0.6 mm-WIDE SLITS | 8/10 | 8/8 |
| COMPARATIVE EXAMPLE 2 | ONE-PIECE, WITH 0.9 mm-WIDE SLITS | 10/10 | 6/10 |
| EXAMPLE | TWO-PIECE, SLIDABLE | 10/10 | 10/10 |

SECONDARY BATTERY AND SECONDARY BATTERY MANUFACTURING METHOD

INCORPORATION BY REFERENCE

The disclosures of Japanese Patent Application No. 2017-048305 filed on Mar. 14, 2017 and Japanese Patent Application No. 2017-19425 filed on Feb. 6, 2017 including the specifications, drawings and abstracts are incorporated herein by reference in its entirety.

BACKGROUND

1. Technical Field

The present disclosure relates to a secondary battery and a secondary battery manufacturing method.

2. Description of Related Art

To realize high-efficiency discharge and high capacity, an electrode body of a secondary battery is formed by laminating or rolling a plurality of electrode foils. The electrode body is housed inside a case body along with a collector terminal (also called a current collector), and an external terminal is arranged on an outer side of the case body (on a lid). The collector terminal mounted on the electrode body electrically connects the electrode body and the external terminal to each other.

As disclosed in Japanese Patent Application Publication No. 10-106536, ends of a plurality of collector foils composing an electrode body are inserted in a bundled state into a slit provided in a collector terminal, and these ends and the collector terminal are welded together by laser welding. A technique similar to this is also disclosed in Japanese Patent Application Publication No. 2013-179015 etc.

SUMMARY

A collector terminal conventionally used in a secondary battery and a secondary battery manufacturing method has a plurality of extension parts, and a slit is formed between two adjacent extension parts (see JP 10-106536 A and JP 2013-179015 A).

If the slit width is too small when inserting the ends of the plurality of collector foils in a bundled state into the slit, it is difficult to insert the ends of the collector foils into the slit. As a result, it may be difficult to install the collector terminal on the electrode body. On the other hand, if the slit width is too large, i.e., the interval between two extension portions is too large when joining the ends of the plurality of collector foils in a bundled state to the collector terminal by laser welding, it is difficult to bring the ends of the collector foils and the extension parts of the collector terminal into contact with each other, and a welding laser passes through the slit and reaches the collector foils or separators located on the inner side of the collector terminal (so-called laser pass-through). As a result, it may be difficult to perform welding appropriately.

The present disclosure provides a secondary battery having a configuration that allows a collector terminal to be installed on an electrode body easily and joined to the electrode body easily and stably, and a manufacturing method of this secondary battery.

A first aspect of the present disclosure relates to a secondary battery. The secondary battery includes an electrode body, a first collector terminal, and a second collector terminal. The electrode body includes an electrode main body including a positive-electrode collector foil and a negative-electrode collector foil being laminated with a separator between the positive-electrode collector foil and the negative-electrode collector foil, each of the positive-electrode collector foil and the negative-electrode collector foil includes a collector foil protrusion section that protrudes from the electrode main body to an outside of the electrode main body, and a collector foil connection portion is located at an outer end of the collector foil protrusion section. The first collector terminal includes a first extension part that is shaped so as to extend along a longitudinal direction of the collector foil connection portion, and the first extension part is welded to the collector foil connection portion. The second collector terminal is a member separate from the first collector terminal, and includes a second extension part that is shaped so as to extend along the longitudinal direction and is welded to the collector foil connection portion. The first extension part and the second extension part are located on the opposite sides of the collector foil connection portion. The secondary battery includes a welded joint at which both the first extension part and the second extension part are welded to the collector foil connection portion such that the first extension part, the second extension part, and the collector foil connection portion are united. The first collector terminal and the second collector terminal are united through the welded joint.

The secondary battery configured as described above includes the first collector terminal and the second collector terminal that is a member separate from the first collector terminal. Thus, in the manufacturing process of this secondary battery, the first collector terminal and the second collector terminal can be moved relative to each other so as to change a width of the slit into which the collector foil connection portion is inserted. For example, to insert the collector foil connection portion into the slit, the first collector terminal and the second collector terminal can be arranged so as to maximize the width of the slit within the range of movement of the collector terminals. The collector foil connection portion can be inserted into the slit in this state, which makes it easy to install the first collector terminal and the second collector terminal on the electrode body. On the other hand, to perform laser welding, the first collector terminal and the second collector terminal can be arranged so as to reduce the width of the slit, which makes it easy to bring the collector foil connection portion and the first and second collector terminals into contact with each other. Thus, laser welding can be appropriately performed without causing so-called laser pass-through, such that a high-quality secondary battery can be produced.

In the first aspect of the present disclosure, the collector foil connection portion may include a plurality of the positive-electrode collector foils or a plurality of the negative-electrode collector foils.

In the first aspect of the present disclosure, the first extension part may include a first extension portion and a second extension portion adjacent to first extension portion across a clearance. The collector foil connection portion may be arranged so as to pass through the clearance in a direction from an inside of the electrode main body toward the outside of the electrode main body. The first extension portion may include a shape of a flat plate extending along the longitudinal direction, and the first extension portion may include a first end on side coming in contact with the collector foil connection portion, and a protrusion that is shaped so as to project from the first end in the direction from the inside toward the outside. The second extension part may be arranged so as to lie on a first outer surface that is a surface of the second extension portion on the opposite side from a surface of the second extension portion facing the electrode main body, and a second end of the second extension part on a side coming in contact with the collector foil connection portion, the collector foil connection portion, and the protrusion may be united by the welded joint.

According to this configuration, the clearance formed between the first extension portion and the second extension portion can be reduced, compared with when the second extension part is arranged between the first extension portion and the second extension portion. Thus, it is possible to downsize the first collector terminal and the second collector terminal, and ultimately to downsize the secondary battery as a whole.

In the first aspect of the present disclosure, the second extension part may include a second outer surface that is a surface of the second extension part on the opposite side from a surface of the second extension part facing the electrode main body. The protrusion may include a third outer surface that is a surface of the protrusion on the opposite side from a surface of the protrusion facing the electrode main body. The second outer surface and the third outer surface may be flush with each other. Being flush here not only means being exactly flush but also means being flush as judged by technical common sense, i.e., being substantially flush.

According to this configuration, during welding, the first collector terminal and the second collector terminal are brought into contact with or pressed against the collector foil connection portion evenly from both sides. Thus, without the collector foil connection portion being curved or bent, the first collector terminal and the second collector terminal can be welded to the collector foil connection portion stably and easily.

In the first aspect of the present disclosure, the welded joint may be configured such that a part of the protrusion other than both ends of the protrusion in the longitudinal direction, the collector foil connection portion, and the second end are welded together.

With respect to this configuration, in welding, the collector foil connection portion etc. being welded undergo a state transition from solid state to liquid state and back to solid state. Accordingly, the width of the clearance into which the collector foil connection portion is inserted also changes in the welding process. According to the above configuration, the amount of change in the width of the clearance can be reduced such that the state of the welded joint after welding is less affected. Moreover, the weld length of the welded joint can be reduced so as to reduce the thermal influence on the separators that are present near the welded zone and have low resistance to heat.

In the first aspect of the present disclosure, the first collector terminal and the second collector terminal may be made of the same type of metal.

In the first aspect of the present disclosure, the first collector terminal may include an L-shaped first base part, and the first extension part may be configured to extend from the L-shaped first base part. The second collector terminal may include an L-shaped second base part, and the L-shaped second extension part may be configured to extend from the second base part.

In the first aspect of the present disclosure, the first collector terminal may include an L-shaped first base part, and the first extension part may be configured to extend from the L-shaped first base part. The second collector terminal may include a second base part including a flat plate shape, and the second extension part and the second base part may be flush with each other. Being flush here not only means being exactly flush but also means being flush as judged by technical common sense, i.e., being substantially flush.

In the first aspect of the present disclosure, the first extension part may be shaped so as to extend from a first base part of the first collector terminal along the longitudinal direction, and the first extension part may be curved in a direction from the outside toward the inside of the electrode main body relative to an end of the first base part that adjoins the first extension part. The second extension part may be shaped so as to extend from a second base part of the second collector terminal along the longitudinal direction, and the second extension part may be curved in the direction from the outside toward the inside of the electrode main body relative to an end of the second base part that adjoins the second extension part.

In the first aspect of the present disclosure, the first extension part and the second extension part may be located in the same plane perpendicular to a direction from the inside toward the outside of the electrode main body, and the first extension part and the second extension part may be located alternately in a thickness direction of the electrode body.

A second aspect of the present disclosure relates to a secondary battery manufacturing method. The secondary battery manufacturing method includes preparing an electrode body including an electrode main body including a positive-electrode collector foil and a negative-electrode collector foil being laminated with a separator between the positive-electrode collector foil and the negative-electrode collector foil, each of the positive-electrode collector foil and the negative-electrode collector foil including a collector foil protrusion section that protrudes from the electrode main body to an outside of the electrode main body, and a collector foil connection portion that is located at an outer end of the collector foil protrusion section. The secondary battery manufacturing method includes preparing a first collector terminal and a second collector terminal that is a member separate from the first collector terminal. The first collector terminal includes a first extension part that is shaped so as to extend along a longitudinal direction of the collector foil connection portion. The second collector terminal includes a second extension part that is shaped so as to extend along the longitudinal direction. The secondary battery manufacturing method further includes: arranging the first collector terminal and the second collector terminal such that the first extension part and the second extension part are located on the opposite sides of the collector foil connection portion; bringing both the first extension part and the second extension part into contact with the collector foil connection portion by moving the first collector terminal and the second collector terminal relative to each other such that the first extension part and the second extension part approach each other; and performing laser welding in a state where both the first extension part and the second extension part are in contact with the collector foil connection portion, so as to form a welded joint that unites the first extension part, the second extension part, and the collector foil connection portion, and thus uniting the first collector terminal and the second collector terminal through the welded joint.

According to this configuration, the first collector terminal is a member separate from and the second collector terminal. Thus, in the manufacturing process of the secondary battery, the first collector terminal and the second collector terminal can be moved relative to each other so as to change a width of the slit into which the collector foil connection portion is inserted. For example, to insert the collector foil connection portion into the slit, the first collector terminal and the second collector terminal can be arranged so as to maximize the width of the slit within the range of movement of the collector terminals. The collector foil connection portion can be inserted into the slit in this state, which makes it easy to install the first collector terminal and the second collector terminal on the electrode body. On the other hand, to perform laser welding, the first collector terminal and the second collector terminal can be arranged so as to reduce the width of the slit, which makes it easy to bring the collector foil connection portion and the first and second collector terminals into contact with each other. Thus, laser welding can be appropriately performed without causing so-called laser pass-through, such that a high-quality secondary battery can be produced.

In the second aspect of the present disclosure, the collector foil connection portion may include a plurality of the positive-electrode collector foils or a plurality of the negative-electrode collector foils.

In the second aspect of the present disclosure, the first collector terminal may include a first extension portion and a second extension portion adjacent to the first extension portion across a clearance. The first extension portion may include a shape of a flat plate extending along the longitudinal direction, and the first extension portion may include a first end that comes in contact with the collector foil connection portion, and a protrusion that is shaped so as to project from the first end in a direction from an inside of the electrode main body toward the outside of the electrode main body. Arranging the first collector terminal and the second collector terminal may include forming a slit between the second extension part and the protrusion by arranging the second extension part so as to lie on a first outer surface that is a surface of the second extension portion on the opposite side from a surface of the second extension portion facing the electrode main body, and then arranging the first collector terminal and the second collector terminal such that the collector foil connection portion passes through the slit in the direction from the inside toward the outside. In performing the laser welding, the laser welding may be performed in a state where both the protrusion and a second end of the second extension part that comes in contact with the collector foil connection portion are in contact with the collector foil connection portion, and the second end, the collector foil connection portion, and the protrusion may be united as the welded joint is formed.

According to this configuration, the clearance formed between the first extension portion and the second extension portion can be reduced, compared with when the second extension part is arranged between the first extension portion and the second extension portion. Thus, it is possible to downsize the first collector terminal and the second collector terminal, and ultimately to downsize the secondary battery as a whole.

In the second aspect of the present disclosure, the second extension part may include a second outer surface that is a surface of the second extension part on the opposite side from a surface of the second extension part facing the electrode main body. The protrusion may include a third outer surface that is a surface of the protrusion on the opposite side from a surface of the protrusion facing the electrode main body. During performing the laser welding, the second outer surface and the third outer surface may be flush with each other. Being flush here not only means being exactly flush but also means being flush as judged by technical common sense, i.e., being substantially flush.

According to this configuration, during welding, the first collector terminal and the second collector terminal are brought into contact with or pressed against the collector foil connection portion evenly from both sides. Thus, without the collector foil connection portion being curved or bent, the first collector terminal and the second collector terminal can be welded to the collector foil connection portion stably and easily.

In the second aspect of the present disclosure, the welded joint may be configured such that a part of the protrusion other than both ends of protrusion in the longitudinal direction, the collector foil connection portion, and the second end are welded together.

With respect to this configuration, in welding, the collector foil connection portion etc. being welded undergo a state transition from solid state to liquid state and back to solid state. Accordingly, the width of the clearance into which the collector foil connection portion is inserted also changes in the welding process. According to the above configuration, the amount of change in the width of the clearance can be reduced such that the state of the welded joint after welding is less affected. Moreover, the weld length of the welded joint can be reduced so as to reduce the thermal influence on the separators that are present near the welded zone and have low resistance to heat.

In the second aspect of the present disclosure, the first collector terminal may include a first extension portion and a second extension portion adjacent to the first extension portion across a clearance. The first extension portion may include a shape of a flat plate extending along the longitudinal direction, and the first extension portion may include a first end that comes in contact with the collector foil connection portion, and a protrusion that is shaped so as to project from the first end in a direction from the inside toward the outside of the electrode main body. Arranging the first collector terminal and the second collector terminal may include inserting the collector foil connection portion so as to pass through the clearance in the direction from the inside toward the outside, and then arranging the second extension part so as to lie on a first outer surface that is a surface of the second extension portion on the opposite side from a surface of the second extension portion facing the electrode main body, such that the collector foil connection portion is arranged between the second extension part and the protrusion. In performing the laser welding, the laser welding may be performed in a state where both the protrusion and a second end of the second extension part that comes in contact with the collector foil connection portion are in contact with the collector foil connection portion, the second end, the collector foil connection portion, and the protrusion may be united as the welded joint is formed.

According to the present disclosure, a secondary battery having a configuration that allows a collector terminal to be installed on an electrode body easily and joined to the electrode body easily and stably, and a manufacturing method of this secondary battery can be provided.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Embodiments will be described below with reference to the drawings. The same or equivalent parts will be denoted by the same reference signs, while overlapping description may be omitted.

Embodiment 1

Secondary Battery 100

Figure 1:
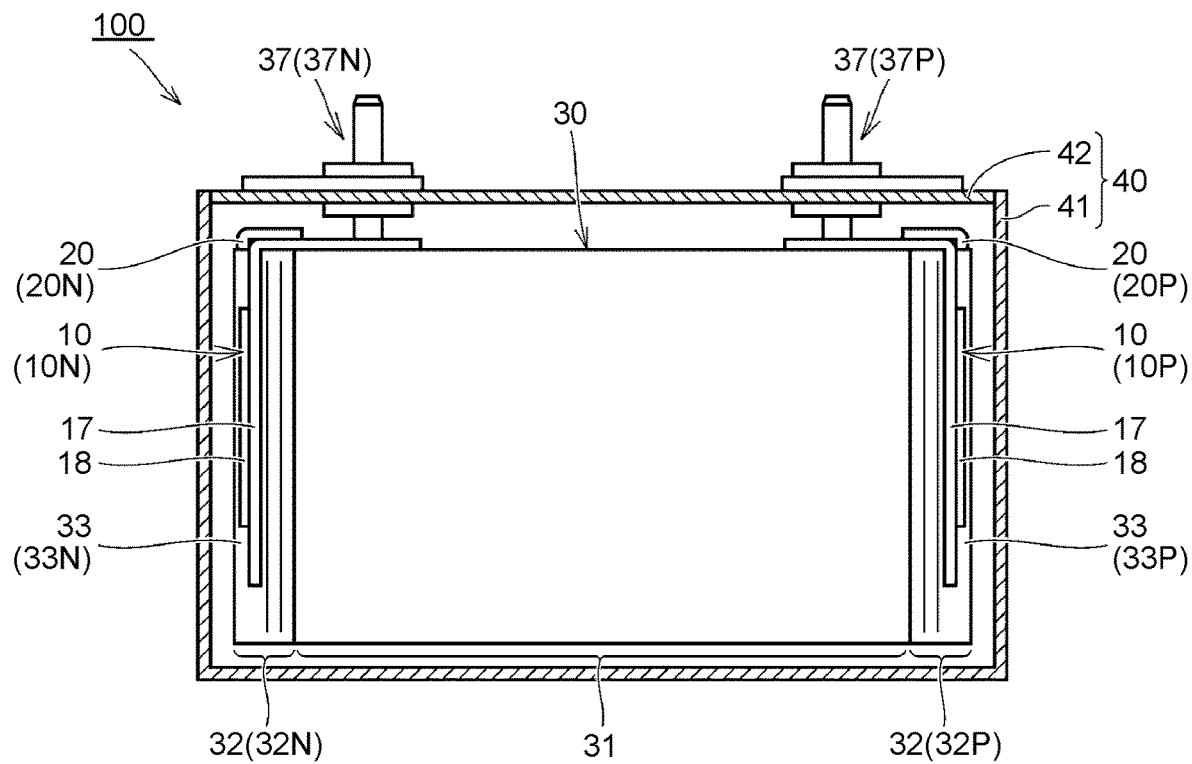
FIG. 1 is a sectional view showing a secondary battery 100 in Embodiment 1.

FIG. 1 is a sectional view showing a secondary battery 100 in Embodiment 1. The secondary battery 100 is a non-aqueous electrolyte secondary battery, and for example, can be used as a lithium ion battery. The secondary battery 100 is used to drive a vehicle, for example, and is installed in a hybrid electric vehicle that is powered by an internal combustion engine, such as a gasoline engine or a diesel engine, and by a motor that is supplied with electricity from a chargeable-dischargeable battery, a plug-in hybrid electric vehicle that can be charged from outside, an electric vehicle, etc.

The secondary battery 100 includes an electrode body 30, a case body 40, a positive-electrode external terminal 37P, a negative-electrode external terminal 37N, positive-electrode collector terminals 10P, 20P, and negative-electrode collector terminals 10N, 20N. Hereinafter, when no distinction is made between the positive-electrode external terminal 37P and the negative-electrode external terminal 37N (in other words, when a configuration common to both is described; the same applies hereinafter), these terminals will be referred to as external terminals 37. When no distinction is made between the positive-electrode collector terminal 10P and the negative-electrode collector terminal 10N, these terminals will be referred to simply as first collector terminals 10. When no distinction is made between the positive-electrode collector terminal 20P and the negative-electrode collector terminal 20N, these terminals will be referred to simply as second collector terminals 20.

Case Body 40

The case body 40 includes a main body 41 and a lid 42, and defines the external appearance of the secondary battery 100. The main body 41 and the lid 42 are made of a metal, such as aluminum. The main body 41 has a shape of a rectangular tube with a bottom, and the lid 42 is provided so as to cover an opening of the main body 41. The external terminals 37 (the positive-electrode external terminal 37P and the negative-electrode external terminal 37N) are mounted on the lid 42.

Electrode Body 30

Figure 2:
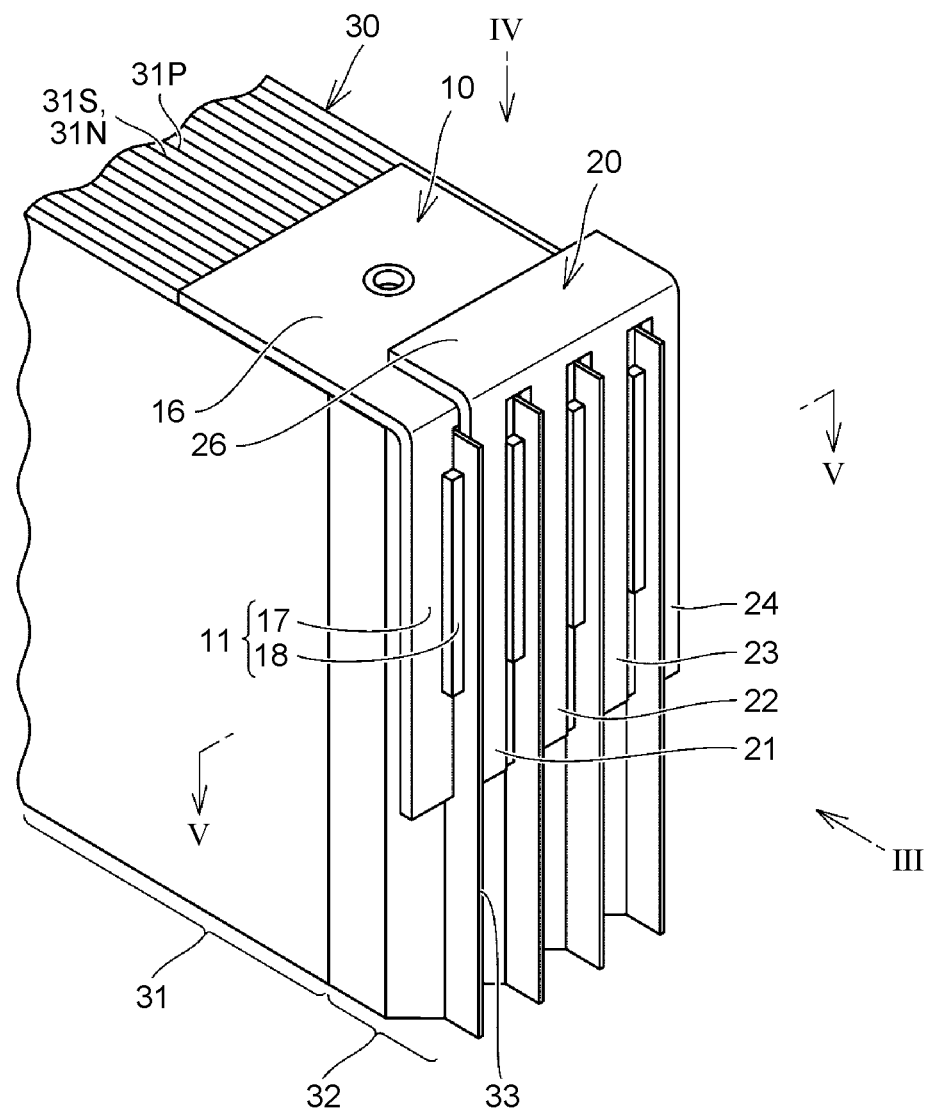
FIG. 2 is a perspective view showing an electrode body 30, a first collector terminal 10, and a second collector terminal 20 of the secondary battery 100 in Embodiment 1.
Figure 3:
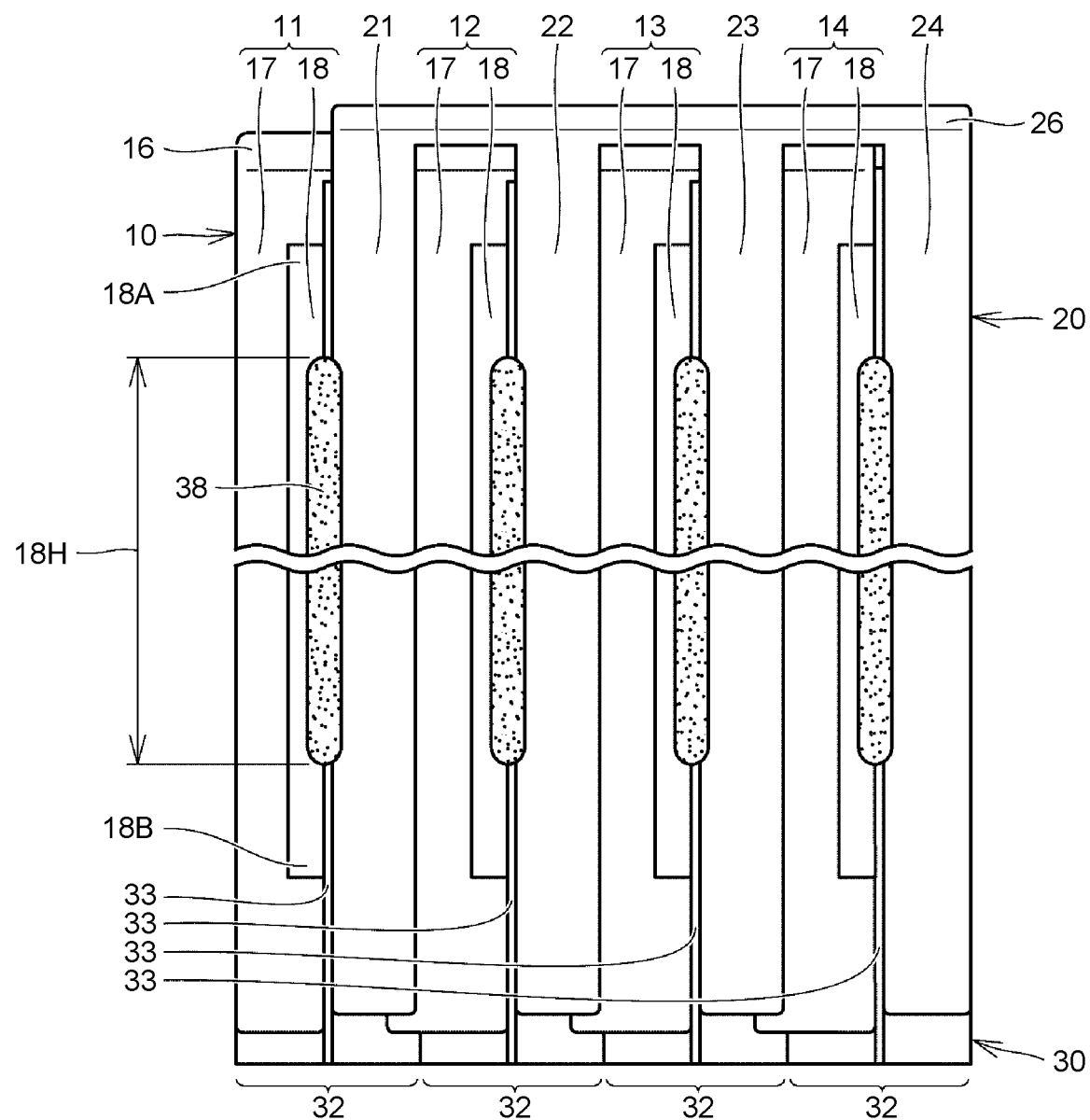
FIG. 3 is a view (side view) of the first collector terminal 10, the second collector terminal 20, etc. as seen along the arrow III in FIG. 2.
Figure 4:
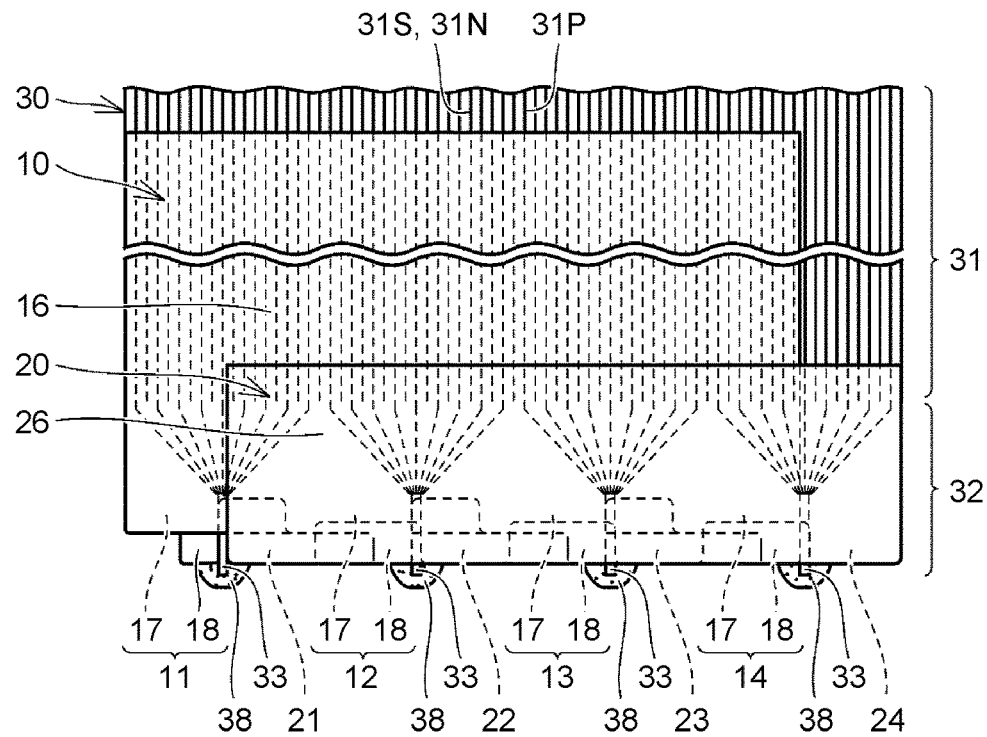
FIG. 4 is a view (plan view) of the first collector terminal 10, the second collector terminal 20, etc. as seen along the arrow IV in FIG. 2.
Figure 5:
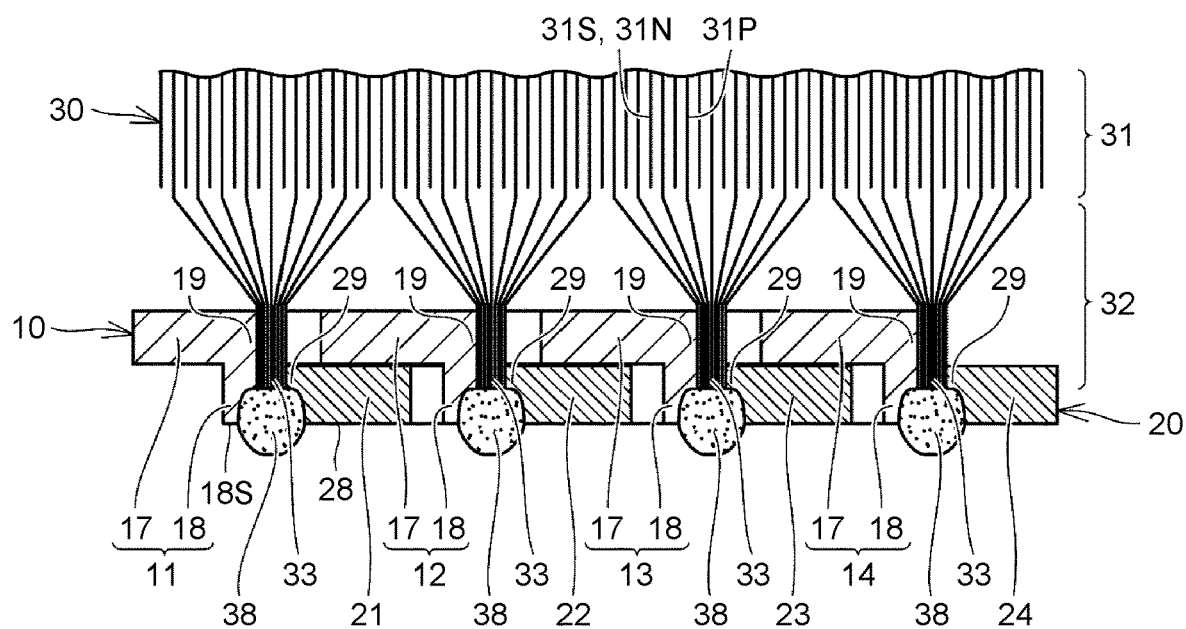
FIG. 5 is a sectional view taken along the line V-V in FIG. 2.
Figure 6:
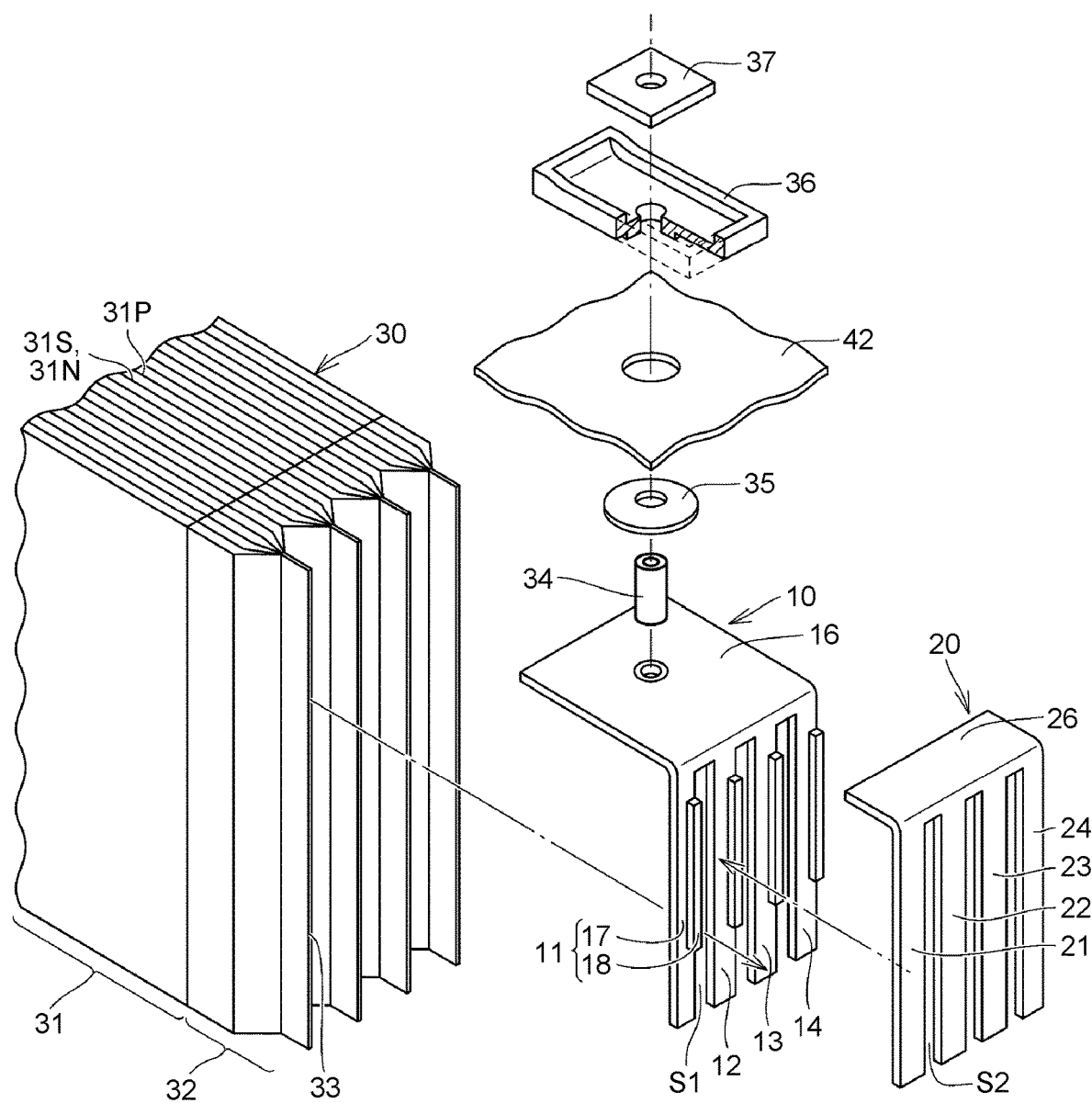
FIG. 6 is an exploded perspective view showing the first collector terminal 10, the second collector terminal 20, etc. of the secondary battery 100 in Embodiment 1.

FIG. 2 is a perspective view showing the electrode body 30, the first collector terminal 10, and the second collector terminal 20 of the secondary battery 100. FIG. 3 is a view (side view) showing the first collector terminal 10, the second collector terminal 20, etc. as seen along the arrow III in FIG. 2. FIG. 4 is a view (plan view) showing the first collector terminal 10, the second collector terminal 20, etc. as seen along the arrow IV in FIG. 2. FIG. 5 is a sectional view taken along the line V-V in FIG. 2. FIG. 6 is an exploded perspective view of the first collector terminal 10, the second collector terminal 20, etc.

Referring to FIG. 2 to FIG. 6, the electrode body 30 is housed inside the case body 40 (see also FIG. 1). The electrode body 30 is formed by a laminate of a plurality of positive-electrode collector foils 31P, a plurality of separators 31S, and a plurality of negative-electrode collector foils 31N. Alternatively, the electrode body 30 may be formed by a roll of these components. For example, the positive-electrode collector foil 31P is formed by an aluminum foil, and a paste containing a positive-electrode active material is applied to both sides of the positive-electrode collector foil 31P. For example, the negative-electrode collector foil 31N is formed by a copper foil, and a paste containing a negative-electrode active material is applied to both sides of the negative-electrode collector foil 31N.

The separator 31S has a substantially rectangular shape and is formed by a porous polypropylene resin sheet etc. A region of the positive-electrode collector foil 31P in which the positive-electrode active material is applied and a region of the negative-electrode collector foil 31N in which the negative-electrode active material is applied face each other with the separator 31S therebetween. A region of the positive-electrode collector foil 31P in which the positive-electrode active material is not applied is exposed from one end of the separator 31S in a longitudinal direction thereof, while a region of the negative-electrode collector foil 31N in which the negative-electrode active material is not applied is exposed from the other end of the separator 31S in the longitudinal direction thereof.

The electrode body 30 is formed by the plurality of positive-electrode collector foils 31P, the plurality of separators 31S, and the plurality of negative-electrode collector foils 31N being laminated as described above. The electrode body 30 (see FIG. 1) thus configured has, as constituent parts, an electrode main body 31, a positive-electrode collector foil protrusion section 32P, and a negative-electrode collector foil protrusion section 32N. Hereinafter, when no distinction is made between the positive-electrode collector foil protrusion section 32P and the negative-electrode collector foil protrusion section 32N, these sections will be referred to simply as collector foil protrusion sections 32.

The electrode main body 31 is a part in which the positive-electrode collector foils 31P and the negative-electrode collector foils 31N are laminated with the separators 31S therebetween. The positive-electrode collector foil protrusion section 32P is a part in which the positive-electrode collector foils 31P protrude from the electrode main body 31 toward one side, and the negative-electrode collector foil protrusion section 32N is a part in which the negative-electrode collector foils 31N protrude from the electrode main body 31 toward the other side (FIG. 1). The positive-electrode collector foil protrusion section 32P and the negative-electrode collector foil protrusion section 32N protrude from the electrode main body 31 to an outside on both sides of the electrode main body 31. Alternatively, the positive-electrode collector foil protrusion section 32P and the negative-electrode collector foil protrusion section 32N may be configured to protrude from the electrode main body 31 to the outside only on one side of the electrode main body 31.

In the positive-electrode collector foil protrusion section 32P, the plurality of positive-electrode collector foils 31P are laminated in a thickness direction of the electrode body 30. As the plurality of positive-electrode collector foils 31P composing the positive-electrode collector foil protrusion section 32P are gathered so as to converge, a positive-electrode collector foil connection portion 33P is formed at an outer end of the positive-electrode collector foil protrusion section 32P.

In the negative-electrode collector foil protrusion section 32N, the plurality of negative-electrode collector foils 31N are laminated in the thickness direction of the electrode body 30. As the plurality of negative-electrode collector foils 31N composing the negative-electrode collector foil protrusion section 32N are gathered so as to converge, a negative-electrode collector foil connection portion 33N is formed at an outer end of the negative-electrode collector foil protrusion section 32N. Hereinafter, when no distinction is made between the positive-electrode collector foil connection portion 33P and the negative-electrode collector foil connection portion 33N, these portions will be referred to simply as collector foil connection portions 33 (see FIG. 2 to FIG. 6).

First Collector Terminal 10 and Second Collector Terminal 20

As shown in FIG. 6, the external terminal 37 is arranged on the outer side of the case body 40 (FIG. 1), and is laid on an outer surface (upper surface) of the lid 42 through an insulator 36. The first collector terminal 10 and the second collector terminal 20 are arranged inside the case body 40 (FIG. 1), and electrically connect the electrode body 30 and the external terminal 37 to each other.

Specifically, the positive-electrode collector terminals 10P, 20P electrically connect the positive-electrode external terminal 37P (FIG. 1) and the positive-electrode collector foil protrusion section 32P (positive-electrode collector foil connection portion 33P) to each other. The positive-electrode collector terminals 10P, 20P are made of the same type of metal (e.g., aluminum, pure aluminum, or aluminum alloy) as the positive-electrode collector foils 31P.

The negative-electrode collector terminals 10N, 20N electrically connect the negative-electrode external terminal 37N (FIG. 1) and the negative-electrode collector foil protrusion section 32N (negative-electrode collector foil connection portion 33N) to each other. The negative-electrode collector terminals 10N, 20N are made of the same type of metal (e.g., copper, pure copper, or copper alloy) as the negative-electrode collector foils 31N.

The first collector terminal 10 is laid on an inner surface (lower surface) of the lid 42 through an insulator 35. The first collector terminal 10 is electrically connected to the external terminal 37 through an electrically conductive pin member 34. Alternatively, the first collector terminal 10 and the pin member 34 may be integrally molded. The first collector terminal 10 has, as constituent parts, a base part 16 (first base part) and extension parts 11 to 14. A first extension part includes the extension parts 11 to 14. The base part 16 has a portion with a flat plate shape, and is laid on the inner surface of the lid 42 through the insulator 35.

The extension parts 11 to 14 extend in a direction away from the base part 16. The extension parts 11 to 14 are shaped so as to extend in parallel to one another along a longitudinal direction of the collector foil connection portion 33, with a slit S1 (FIG. 8) formed between the adjacent extension parts 11 to 14. The extension parts 11 to 14 are formed so as to be adjacent to each other across the slit S1 (clearance), and are each welded to the collector foil connection portion 33 that is arranged so as to pass through the slit S1 (clearance) in a direction from an inside of the electrode main body 31 toward an outside of the electrode main body 31 (FIG. 5).

Figure 8:
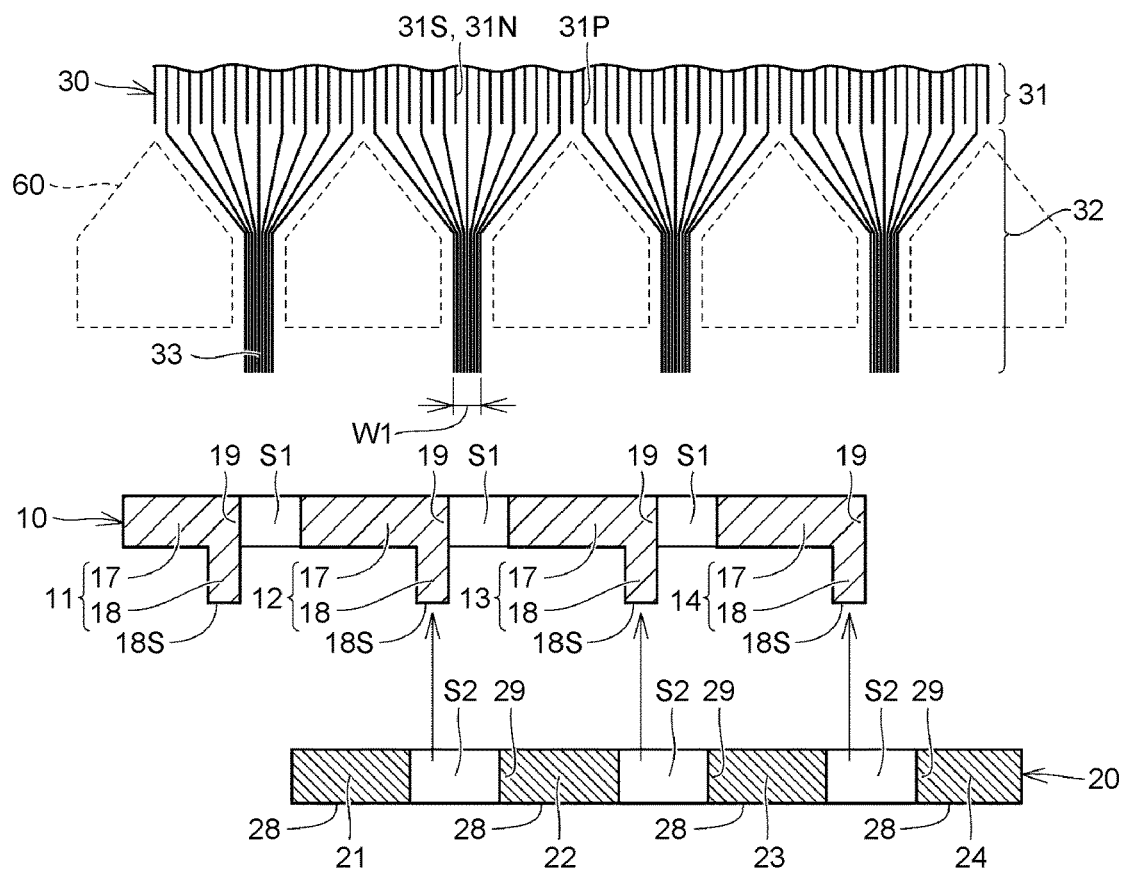
FIG. 8 is a view illustrating an arrangement step (first stage) of the manufacturing method of the secondary battery 100 in Embodiment 1.

The extension parts 11 to 14 each have a flat plate portion 17 that extends along the longitudinal direction of the collector foil connection portion 33, and a protrusion 18 that is shaped so as to project toward the outside from an end 19 (first end; FIG. 5, FIG. 8) of the flat plate portion 17 on a side where the collector foil connection portion 33 is arranged (FIG. 3, FIG. 4). Thus, the protrusion 18 projects from the end 19 in the direction from the inside toward the outside of the electrode main body 31. An outer surface 18S (third outer surface; a region where a welded joint 38 is not formed) of the protrusion 18 has a flat planar shape (see FIG. 8). The outer surface 18S is a surface of the protrusion 18 on the opposite side from a surface of the protrusion 18 facing the electrode main body 31. Before the collector foil connection portions 33 are welded to the extension parts 11 to 14, an end surface of the flat plate portion 17 located on the side of the end 19 and an end surface of the protrusion 18 located on the side of the end 19 are smoothly continuous so as to form one flat surface, and are parallel to a protrusion direction of the collector foil connection portion 33 (an up-down direction in FIG. 5) (see FIG. 8).

The second collector terminal 20 is member separate from the first collector terminal 10, and the second collector terminal 20 has, as constituent parts, a base part 26 (second base part) and extension parts 21 to 24. The base part 26 has a portion with a flat plate shape, and is laid on an upper surface of the base part 16. The extension parts 21 to 24 extend in a direction away from the base part 26. The extension parts 21 to 24 are each shaped so as to extend along the longitudinal direction of the collector foil connection portion 33, and an outer surface 28 (second outer surface; a region where the welded joint 38 is not formed) of each of the extension parts 21 to 24 has a flat planar shape (see FIG. 8). The outer surface 28 is a surface of each of the extension parts 21 to 24 on the opposite side from a surface facing the electrode main body 31.

A slit S2 (FIG. 8) is formed between the adjacent extension parts 21 to 24. The extension parts 21 to 24 are formed so as to be adjacent to each other across the slit S2 (clearance), and are each welded to the collector foil connection portion 33 that is arranged so as to pass through the slit S2 (clearance) in the direction from the inside toward the outside of the electrode main body 31 (FIG. 5). Before the collector foil connection portions 33 are welded to the extension parts 21 to 24, an end 29 (second end) of each of the extension parts 21 to 24 on the side where the collector foil connection portion 33 is located is parallel to the protrusion direction of the collector foil connection portion 33 (the up-down direction in FIG. 5) (see FIG. 8).

Here, the extension parts 11 to 14 (first extension part) of the first collector terminal 10 and the extension parts 21 to 24 (second extension part) of the second collector terminal 20 are respectively located with one collector foil connection portion 33 therebetween (located on the opposite sides of one collector foil connection portion 33) (FIG. 5). As both the extension part 11 and the extension part 21 are welded to the collector foil connection portion 33 located therebetween, the welded joint 38 that unites the extension part 11, the extension part 21, and the collector foil connection portion 33 located therebetween is formed. The first collector terminal 10 and the second collector terminal 20 are united through the welded joint 38.

In this embodiment, the first collector terminal 10 includes the extension part 11 (first extension portion) and the extension part 12 (second extension portion), and the extension part 21 (second extension part) of the second collector terminal 20 is arranged so as to lie on an outer surface (first outer surface) of the flat plate portion 17 of the extension part 12 (second extension portion). The outer surface of the flat plate portion 17 is a surface of the flat plate portion 17 on the opposite side from a surface facing the electrode main body 31. The end 29 of the extension part 21 (second extension part) on the side where the collector foil connection portion 33 is located (the side coming in contact with the collector foil connection portion 33), the protrusion 18 provided on the extension part 11 (first extension portion), and the collector foil connection portion 33 located therebetween, are united by the welded joint 38.

As shown in FIG. 5, the relation between the extension parts 12, 22 and the collector foil connection portion 33 located therebetween, the relation between the extension parts 13, 23 and the collector foil connection portion 33 located therebetween, and the relation between the extension parts 14, 24 and the collector foil connection portion 33 located therebetween, are the same as the above-described relation between the extension parts 11, 21 and the collector foil connection portion 33 located therebetween. In this embodiment, while the first collector terminal 10 and the second collector terminal 20 are formed as separate members, these terminals are united through the four welded joints 38.

Manufacturing Method

Figure 7:
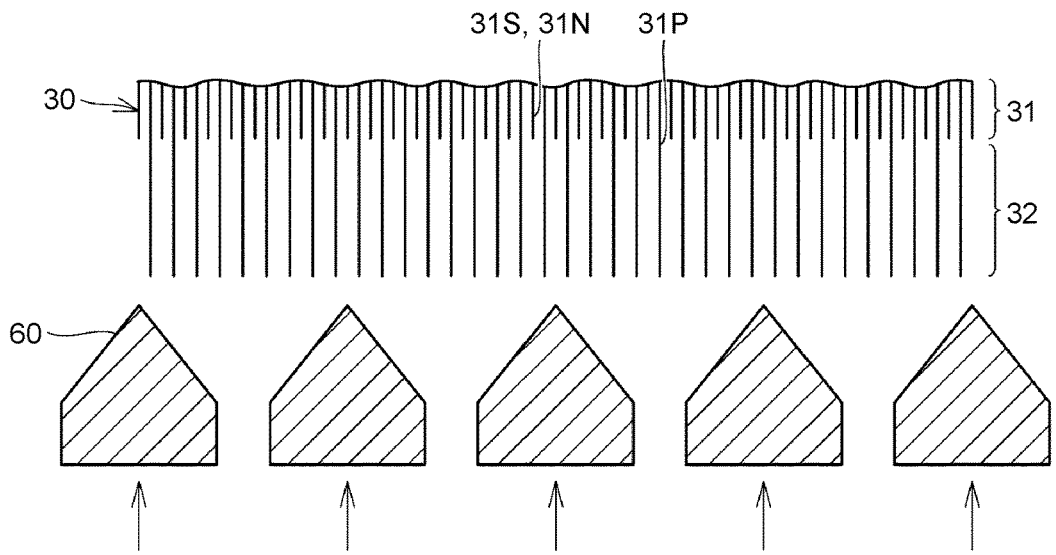
FIG. 7 is a view illustrating a preparation step of a manufacturing method of the secondary battery 100 in Embodiment 1.

A manufacturing method of the secondary battery 100 will be described below with reference to FIG. 7 to FIG. 11. Referring to FIG. 7, first, the electrode body 30 is prepared. Specifically, the plurality of positive-electrode collector foils 31P, the plurality of separators 31S, and the plurality of negative-electrode collector foils 31N are laminated. Thus, a laminate (an intermediate product of the electrode body 30) is produced that includes the electrode main body 31 that is formed by the positive-electrode collector foils 31P and the negative-electrode collector foils 31N being laminated with the separators 31S therebetween, and the collector foil protrusion sections 32 (the positive-electrode collector foil protrusion section 32P and the negative-electrode collector foil protrusion section 32N) that are formed by the positive-electrode collector foils 31P and the negative-electrode collector foils 31N protruding from the electrode main body 31 toward the outside respectively on both sides of the electrode main body 31. Alternatively, this laminate may include the collector foil protrusion sections 32 (the positive-electrode collector foil protrusion section 32P and the negative-electrode collector foil protrusion section 32N) that are formed by both the positive-electrode collector foils 31P and the negative-electrode collector foils 31N protruding from the electrode main body 31 toward the outside on one side of the electrode main body 31.

Then, using a jig 60 having sloped surfaces, the plurality of collector foils (the positive-electrode collector foils 31P and the negative-electrode collector foils 31N) composing the collector foil protrusion section 32 are gathered so as to converge. Each of the collector foil connection portions 33 (the positive-electrode collector foil connection portion 33P and the negative-electrode collector foil connection portion 33N) having a width W1 (FIG. 8) is formed at the outer end of the collector foil protrusion section 32 by the plurality of collector foils composing the collector foil protrusion section 32. Thus, the electrode body 30 including the electrode main body 31, the collector foil protrusion sections 32, and the collector foil connection portions 33 is prepared.

Referring to FIG. 8, next, the first collector terminal 10 and the second collector terminal 20 are prepared. As described above, the first collector terminal 10 includes the extension parts 11 to 14 that are formed so as to be adjacent to each other across the clearance (slit S1), and the extension parts 11 to 14 are shaped so as to extend along the longitudinal direction of the collector foil connection portion 33. The extension parts 11 to 14 each have the flat plate portion 17 that extends along the longitudinal direction of the collector foil connection portion 33, and the protrusion 18 (FIG. 3, FIG. 4) that is shaped so as to project toward the outside from the end 19 (FIG. 5, FIG. 8) of the flat plate portion 17 on the side where the collector foil connection portion 33 is arranged. The extension part 11 corresponds to the first extension portion, and the extension part 12 corresponds to the second extension portion.

The second collector terminal 20 includes the extension parts 21 to 24 that are formed so as to be adjacent to each other across the clearance (slit S2), and the extension parts 21 to 24 are also shaped so as to extend along the longitudinal direction of the collector foil connection portion 33. The extension parts 21 to 24 correspond to the second extension part, and as described above, the second collector terminal 20 is a member separate from the first collector terminal 10. The first collector terminal 10 having this configuration can be easily produced by forming three slits (slits S1) with a predetermined width in a metal sheet by laser processing or press working, and then bending a part of the metal sheet corresponding to the base part 16 into an L-shape.

Arrangement Step

Then, the second collector terminal 20 is laid on an outer side of the first collector terminal 10. At the same time, the protrusions 18 of the extension parts 12 to 14 are inserted into the slits S2 provided in the second collector terminal 20. The extension part 21 (second extension part) of the second collector terminal 20 is arranged between the protrusion 18 of the extension part 11 (first extension portion) and the protrusion 18 of the extension part 12 (second extension portion). The extension part 21 (second extension part) of the second collector terminal 20 is arranged so as to lie on the outer surface of the flat plate portion 17 of the extension part 12 (second extension portion). The extension parts 21 to 23 of the second collector terminal 20 are arranged so as to respectively lie on the outer surfaces of the extension parts 12 to 14 of the first collector terminal 10, such that slits are formed between the extension parts 21 to 24 and the protrusions 18 of the extension parts 11 to 14.

Figure 9:
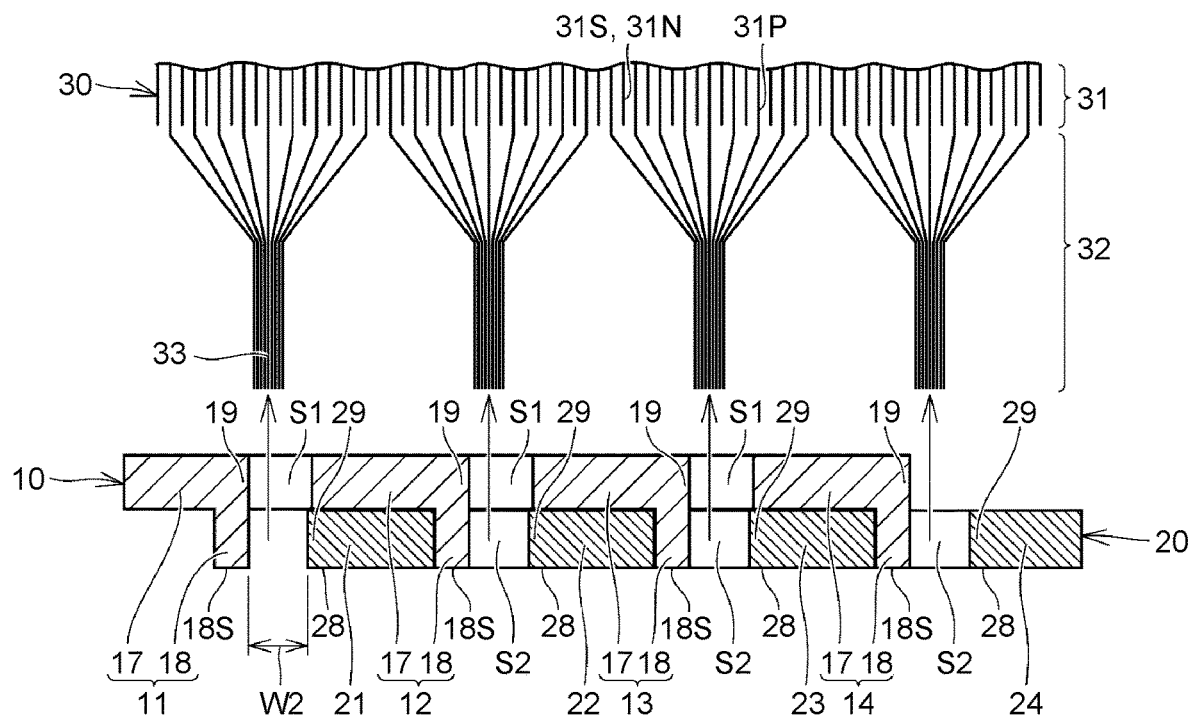
FIG. 9 is a view illustrating the arrangement step (second stage) of the manufacturing method of the secondary battery 100 in Embodiment 1.

Referring to FIG. 9, in this embodiment, in a state where the first collector terminal 10 and the second collector terminal 20 are arranged such that the second collector terminal 20 lies on the first collector terminal 10 as described above, the relation between the end 29 of the extension part 21 (second extension part) on the side where the collector foil connection portion 33 is located and the protrusion 18 provided on the extension part 11 (first extension portion) is such that their respective outer surfaces 28, 18S are substantially flush with each other. The same applies to the extension parts 12 to 14 and the extension parts 22 to 24.

Figure 10:
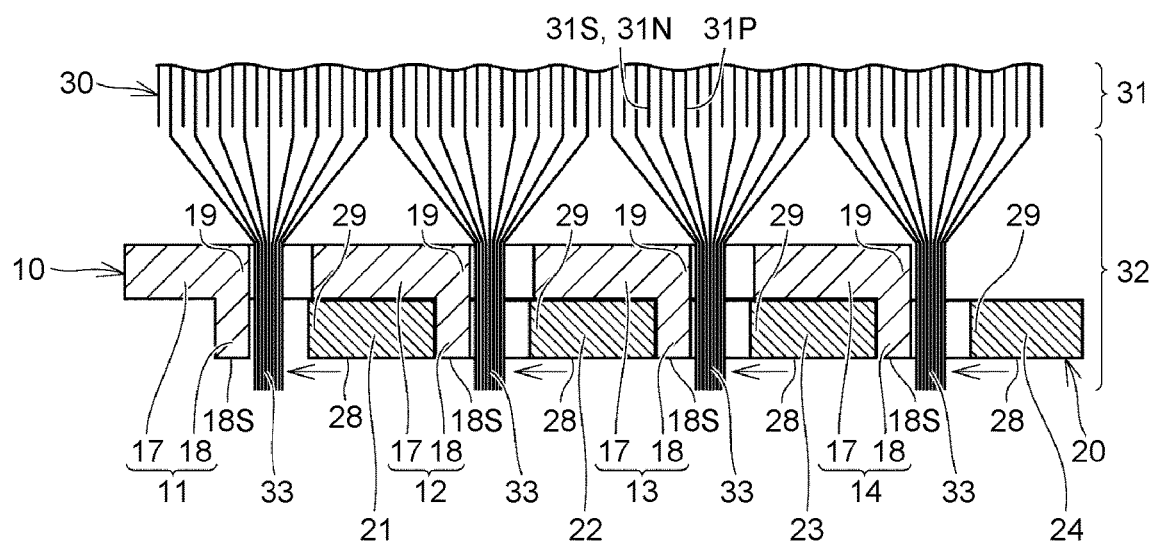
FIG. 10 is a view illustrating the arrangement step (third stage) of the manufacturing method of the secondary battery 100 in Embodiment 1.

As shown in FIG. 9 and FIG. 10, the first collector terminal 10 and the second collector terminal 20 are arranged such that each collector foil connection portion 33 passes through the slits (the clearance (slit S1) between the adjacent extension parts 11 to 14 and the clearance (slit S2) between the adjacent extension parts 21 to 24) in the direction from the inside toward the outside of the electrode main body 31. When this arrangement step is completed, the first collector terminal 10 and the second collector terminal 20 have been arranged (in the state shown in FIG. 10) such that, for example, the extension part 11 (first extension part) and the extension part 21 (second extension part) are located on the opposite sides of one collector foil connection portion 33. The same applies to the extension parts 12 to 14 and the extension parts 22 to 24.

Then, the first collector terminal 10 and the second collector terminal 20 are moved (in this example, slid) relative to each other such that the extension part 11 (first extension part) and the extension part 21 (second extension part) approach each other. The same applies to the extension parts 12 to 14 and the extension parts 22 to 24. As a width W2 (FIG. 9) is evenly reduced along the longitudinal direction of the collector foil connection portion 33, all the extension parts 11 to 14 and the extension parts 21 to 24 can be evenly brought into contact with the corresponding collector foil connection portion 33 located between the adjacent extension parts.

Welding Step

Figure 11:
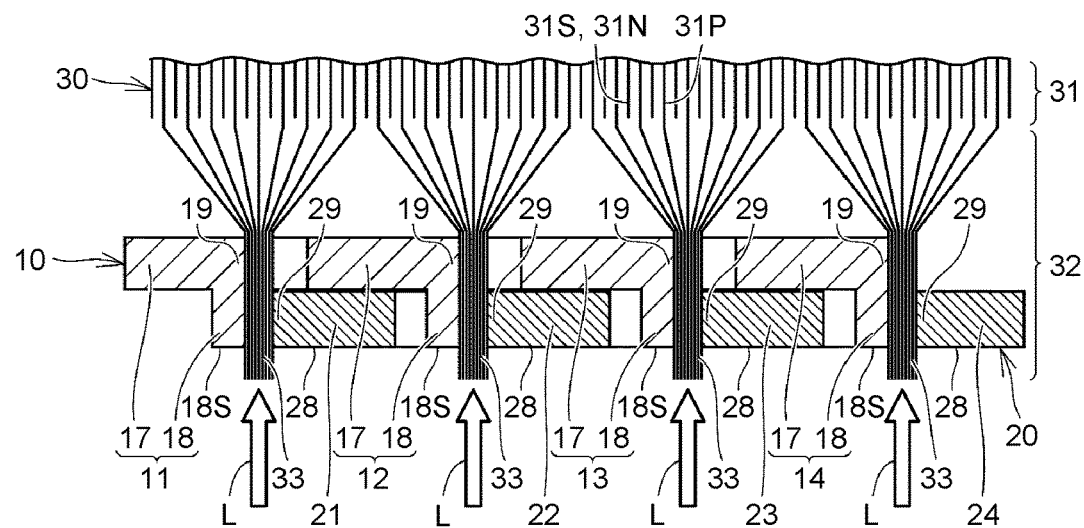
FIG. 11 is a view illustrating a welding step of the manufacturing method of the secondary battery 100 in Embodiment 1.

Referring to FIG. 11, laser welding using a laser L is performed in a state where the protrusion 18 of each of the extension parts 11 to 14 and the end 29 of each of the extension parts 21 to 24 on the side where the collector foil connection portion 33 is located are in contact with the collector foil connection portion 33 located therebetween. To keep a certain amount of clearance between the protrusion 18 and the end 29 (or keep the clearance at a certain value or smaller), laser welding is performed while a pressure is applied to the first collector terminal 10 and the second collector terminal 20 so as to reduce this clearance.

While laser welding is performed, the outer surfaces 18S of the protrusions 18 and the outer surfaces 28 of the extension parts 21 to 24 are substantially flush with each other. The welded joints 38 (FIG. 5) that each unite one of the extension parts 11 to 14, the corresponding one of the extension parts 21 to 24, and the collector foil connection portion 33 located therebetween are formed. The first collector terminal 10 and the second collector terminal 20 are united through the welded joints 38 (in this embodiment, four welded joints 38).

In this embodiment (see FIG. 3), the welded joint 38 is provided such that a part 18H of the protrusion 18 of the extension part 11 (first extension portion) other than both ends 18A, 18B in the longitudinal direction, the collector foil connection portion 33, and the end 29 (FIG. 5) of the extension part 21 (second extension part) on the side where the collector foil connection portion 33 is located are welded together. The same applies to the extension parts 12 to 14 and the extension parts 22 to 24.

The pin member 34, the insulator 35, the lid 42, the insulator 36, and the external terminal 37 shown in FIG. 6 are installed on the first collector terminal 10 that has been united with the electrode body 30. The electrode body 30 united with the external terminal 37 and the lid 42 (FIG. 1) is housed inside the main body 41 of the main body 40 (FIG. 1), and the lid 42 is welded to the main body 41. An electrolyte is poured into the case body 41 through an electrolyte inlet provided in the lid 42, and then the electrolyte inlet is closed. The secondary battery 100 shown in FIG. 1 is completed by these steps.

Effects and Advantages

In the following, effects and advantages of Embodiment 1 will be described in comparison with the comparative example shown in FIG. 12 to FIG. 14.

Figure 12:
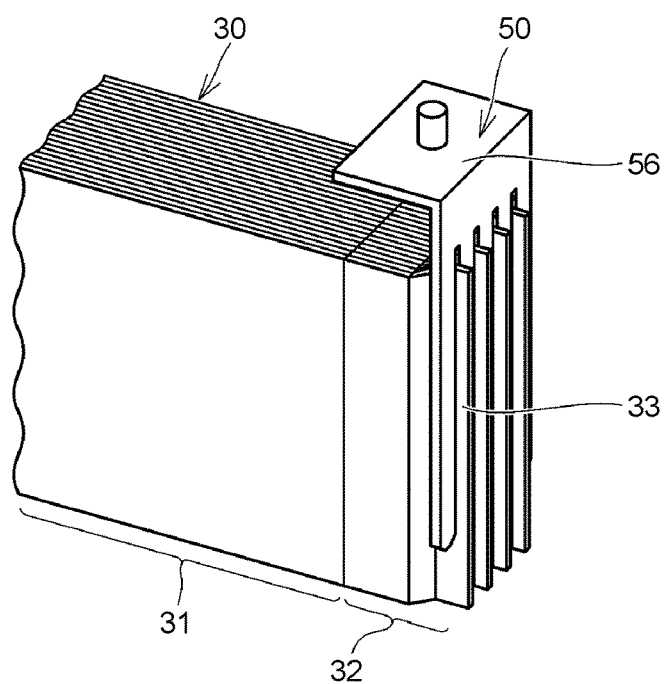
FIG. 12 is a perspective view showing a collector terminal 50 etc. used in a secondary battery and a secondary battery manufacturing method in a comparative example.
Figure 13:
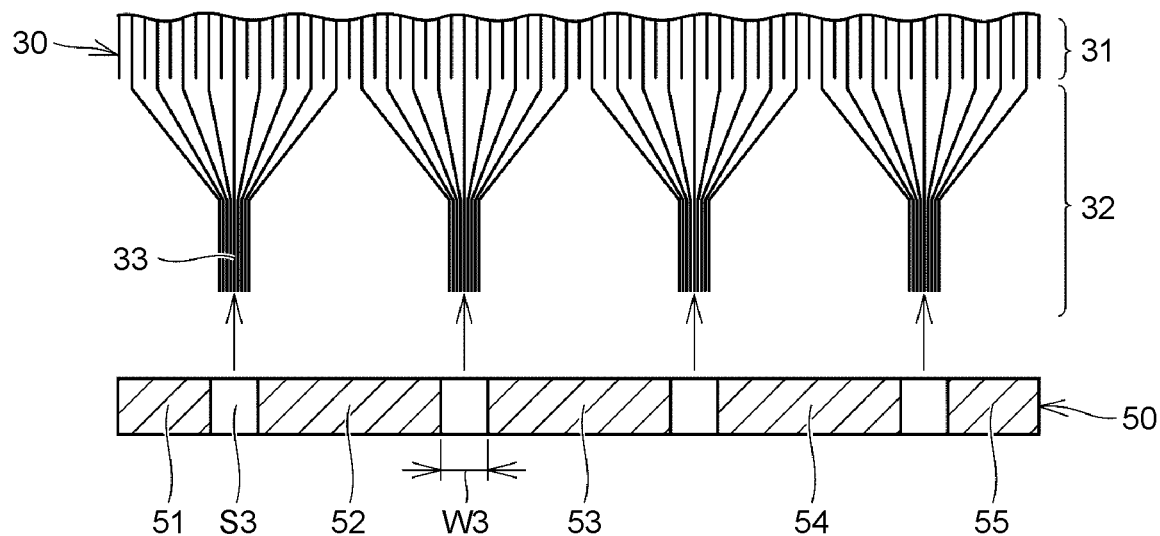
FIG. 13 is a view illustrating an arrangement step of the secondary battery manufacturing method in the comparative example.

In the comparative example shown in FIG. 12, a collector terminal 50 has a base part 56 and a plurality of extension parts 51 to 55, with a slit S3 (FIG. 13) formed between two adjacent extension parts. As shown in FIG. 13, if a width W3 of the slit S3 is too small when inserting the collector foil connection portion 33 into the slit S3, it is difficult to insert the collector foil connection portion 33 into the slit S3. As a result, it is difficult to install the collector terminal 50 on the electrode body 30.

Figure 14:
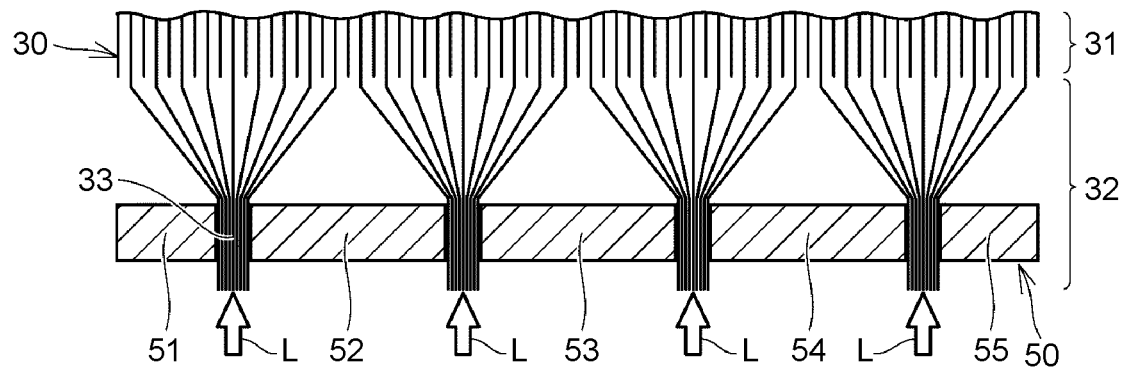
FIG. 14 is a view illustrating a welding step of the secondary battery manufacturing method in the comparative example.

On the other hand, referring to FIG. 14, if the width of the slit S3 is too large, i.e., the interval between the two adjacent extension parts is too large when joining the collector foil connection portions 33 to the extension parts 51 to 55 of the collector terminal 50 by laser welding, it is difficult to join the collector foil connection portions 33 and the extension parts 51 to 55 of the collector terminal 50 to each other. In this case, the welding laser L may pass through the slit S3 and reach the collector foils or the separators located on the inner side of the collector terminal (so-called laser pass-through). As a result, it may be difficult to appropriately perform welding.

By contrast, according to the secondary battery 100 in this embodiment, the portions corresponding to the above slits are formed by the first collector terminal 10 and the second collector terminal 20 that are separate members. According to the secondary battery 100 having this configuration, to insert the ends of the plurality of collector foils (collector foil connection portion 33) in a bundled state into the slit, the first collector terminal 10 and the second collector terminal 20 can be arranged so as to maximize the slit width within the range of movement of the collector terminals. The collector foil connection portion 33 can be inserted into the slit in this state, which makes it easy to install the first collector terminal 10 and the second collector terminal 20 on the electrode body 30.

To join the ends of the plurality of collector foils (collector foil connection portion 33) in a bundled state to the first collector terminal 10 and the second collector terminal 20 by laser welding, the first collector terminal 10 and the second collector terminal 20 can be arranged so as to reduce the slit width, for example, the first collector terminal 10 and/or the second collector terminal 20 can be slid, which makes it easy to bring the collector foil connection portions 33 and the extension parts 11 to 14, 21 to 24 into contact with each other. With the collector foil connection portions 33 and the extension parts 11 to 14, 21 to 24 thus in contact with each other, welding can be appropriately performed without causing so-called laser pass-through in which a welding laser passes through the slit and reaches the electrode body 30 (collector foils) located on the inner side of the first collector terminal 10 and the second collector terminal 20.

In this embodiment, the extension parts 21 to 23 of the second collector terminal 20 are arranged so as to respectively lie on the outer surfaces of the extension parts 12 to 14 of the first collector terminal 10. The end 29 of the extension part 21 (second extension part) on the side where the collector foil connection portion 33 is located, the protrusion 18 provided on the extension part 11 (first extension portion), and the collector foil connection portion 33 located therebetween, are united by the welded joint 38. The same applies to the extension parts 12 to 14 and the extension parts 22 to 24.

With respect to this configuration, it is also possible to arrange each of the extension parts 21 to 24 of the second collector terminal 20 in the slit S1 between the adjacent extension parts 11 to 14 by making the width of the slit S1 larger than that in Embodiment 1. In this case, the extension parts 11 to 14 and the extension parts 21 to 24 are arrayed in the same plane, alternately in the thickness direction of the electrode body 30 (a direction perpendicular to the sheet of FIG. 1). In other words, the extension parts 11 to 14 and the extension parts 21 to 24 are located in the same plane perpendicular to the direction from the inside toward the outside of the electrode main body 31, and the extension parts 11 to 14 and the extension parts 21 to 24 are located alternately in the thickness direction of the electrode body 30. In this case, too, it is possible to increase or reduce the width of the slits formed between the adjacent extension parts 11 to 14, 21 to 24 by moving the first collector terminal 10 and the second collector terminal 20 relative to each other, and thus effects and advantages similar to those of the above embodiment can be produced.

In Embodiment 1, the extension parts 21 to 23 of the second collector terminal 20 are arranged so as to respectively lie on the outer surfaces of the extension parts 12 to 14 of the first collector terminal 10. Although this configuration is not essential, when this configuration is adopted, the width of the slit formed between the adjacent extension parts 11 to 14 can be reduced, compared with when the extension parts 11 to 14 and the extension parts 21 to 24 are alternately arrayed in the same plane. As a result, it is possible to reduce the width of the first collector terminal 10 and the second collector terminal 20 as a whole, and thereby to downsize the secondary battery 100. Moreover, as the end 29 of each of the extension parts 21 to 24, the protrusion 18 provided on each of the extension parts 11 to 14, and the collector foil connection portion 33 located therebetween are united by the welded joint 38, welding can be performed to a required and sufficient degree.

As described above, in Embodiment 1, the relation between the end 29 of the extension part 21 (second extension part) on the side where the collector foil connection portion 33 is located and the protrusion 18 provided on the extension part 11 (first extension portion) is such that their respective outer surfaces 28, 18S are substantially flush with each other. The same applies to the extension parts 12 to 14 and the extension parts 22 to 24. Although this configuration is not essential, according to this configuration, during welding, the end 29 of each of the extension parts 21 to 24 and the protrusion 18 provided on each of the extension parts 11 to 14 are brought into contact with or pressed against the collector foil connection portion 33 evenly from both sides. Thus, without the collector foil connection portion 33 being curved or bent, the end 29 and the protrusion 18 can be welded to the collector foil connection portion 33 stably and easily.

As described above, in this embodiment (see FIG. 3), the welded joint 38 is provided such that the part 18H of the protrusion 18 of the extension part 11 (first extension portion) other than both ends 18A, 18B in the longitudinal direction, the collector foil connection portion 33, and the end 29 (FIG. 5) of the extension part 21 (second extension part) on the side where the collector foil connection portion 33 is located, are welded together. The same applies to the extension parts 12 to 14 and the extension parts 22 to 24.

With respect to this configuration, to stably weld together the extension parts 11 to 14, the extension parts 21 to 24, and the collector foil connection portions 33 therebetween, laser welding is performed while a pressure is applied to the first collector terminal 10 and the second collector terminal 20 so as to reduce the clearances between the extension parts 11 to 14 (in Embodiment 1, the protrusions 18) and the extension parts 21 to 24 (ends 29), and keep a certain amount of clearances therebetween (or keep the clearances at a certain value or smaller). In the welding process, the collector foil connection portions 33 etc. being welded undergo a state transition from solid state to liquid state and back to solid state, and accordingly, the width of the clearances also changes in the welding process.

Here, welding the entire region of the collector foil connection portion 33 that is held between the protrusion 18 and the end 29 requires fusing a larger volume of the object to be welded, and causes a larger amount of change in the width of the clearance. This amount of change in the width of the clearance is preferably as small as possible, since the state of the welded joint 38 after welding is affected by the width of the clearance changing so as to increase and decrease again in the welding process.

In this embodiment, therefore, the welded joint 38 is provided such that the part 18H of the protrusion 18 of each of the extension parts 11 to 14 other than both ends 18A, 18B in the longitudinal direction, the collector foil connection portion 33, and the end 29 (FIG. 5) of each of the extension parts 21 to 24 are welded together. Thus, the sound, stable welded joint 38 can be formed. The weld length of the welded joint 38 can be reduced so as to reduce the thermal influence on the separators 31S that are present near the welded zone and have low resistance to heat. The weld length of the welded joint 38 required for electrical connection can be determined according to the specifications of the secondary battery 100 etc. It is therefore preferable that the weld length of the welded joint 38 be set to a required and sufficient value (e.g., 10 mm) including the part 18H other than both ends 18A, 18B, with the specifications of the secondary battery 100 etc. taken into account.

EXAMPLE

An experiment on Comparative Examples 1 and 2 based on the above-described comparative example and Example based on Embodiment 1 and the result of this experiment will be described with reference to FIG. 15.

Conditions common to Comparative Examples 1 and 2 and Example are as follows: The thickness of the positive-electrode collector foil 31P (aluminum alloy foil) was set to 15 and the thickness of the negative-electrode collector foil 31N (copper foil) was set to 10 The width W1 (FIG. 8) of the collector foil connection portion 33 was set to 0.5 mm. The positive-electrode collector terminal 10P, the positive-electrode collector terminal 20P, and the collector terminal 50, on the positive electrode side, were made of aluminum and had a thickness of 0.8 mm. The negative-electrode collector terminal 10N, the negative-electrode collector terminal 20N, and the collector terminal 50, on the negative electrode side, were made of copper and had a thickness of 0.8 mm.

Welding on the positive electrode side was performed using a fiber laser at output power of 2000 W and speed of 20 mm/sec, over a scanning distance of 10 mm. Welding on the negative electrode side was performed using a fiber laser at output power of 3000 W and speed of 30 mm/sec, over a scanning distance of 10 mm. Under these conditions, and other conditions as shown in FIG. 15, ten samples of secondary batteries were produced for each of Comparative Examples 1 and 2 and Example. As Evaluation 1, the collector foil connection portion 33 as inserted in the slit was visually observed, and as Evaluation 2, the welded zone (welded joint 38) as broken up was visually observed.

Comparative Example 1

In Comparative Example 1, the width W3 of the slit S3 (FIG. 13) was set to 0.6 mm. Evaluation 1 found damage in the collector foil connection portions 33 (tear in the foils) of two samples, which resulted from those collector foil connection portions 33 hitting the extension parts 51 to 55 forming the slits S3 when being inserted into the slits S3. Accordingly, the result of Evaluation 1 is 8/10. Evaluation 2 found that no laser pass-through had occurred in the clearances between the collector foil connection portions 33 and the extension parts 51 to 55. Accordingly, the result of Evaluation 2 is 8/8. From these results, it can be said that Comparative Example 1 has a possibility of causing damage to the collector foil connection portions 33.

Comparative Example 2

In Comparative Example 2, the width W3 of the slit S3 (FIG. 13) was set to 0.9 mm. The collector foil connection portions 33 did not hit the extension parts 51 to 55 when being inserted into the slits S3, such that Evaluation 1 found no damage in the collector foil connection portions 33 (tear in the foils). Accordingly, the result of Evaluation 1 is 10/10. Evaluation 2 found that laser pass-through had occurred in the clearances between the collector foil connection portions 33 and the extension parts 51 to 55 of four samples. Accordingly, the result of Evaluation 2 is 6/10. It is inferred that the width W3 of the slit S3 in Comparative Example 2, which was larger than that in Comparative Example 1, allowed easy insertion of the collector foil connection portions 33, but on the other hand, caused frequent laser pass-through when the collector foil connection portions 33 were held between the adjacent extension parts 51 to 55.

EXAMPLE

Unlike in Comparative Examples 1 and 2, in Example, the part functioning as the collector terminal is composed of two separate members, the first collector terminal 10 and the second collector terminal 20. Thus, the good results, 10/10 in both Evaluations 1 and 2, were attained. Therefore, it can be said that the configuration based on Embodiment 1 can provide a secondary battery having a configuration that allows a collector terminal to be easily installed on an electrode body and easily joined to the electrode body, and a manufacturing method of this secondary battery.

Embodiment 2

A secondary battery manufacturing method in Embodiment 2 will be described with reference to FIG. 16. In the arrangement step (FIG. 8 to FIG. 10) in Embodiment 1, the second collector terminal 20 is laid on the outer side of the first collector terminal 10, and then the collector foil connection portions 33 are passed into the slits formed between the first collector terminal 10 and the second collector terminal 20.

Figures 15, 16:
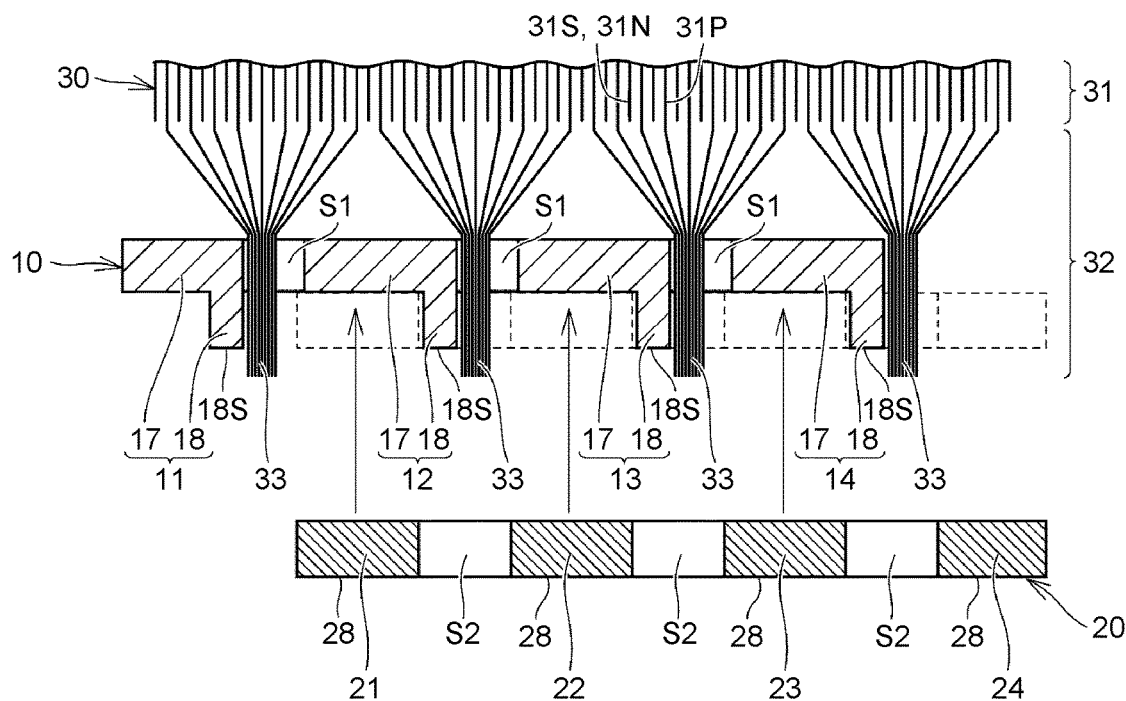
FIG. 15 is a table illustrating an experiment on Comparative Examples 1 and 2 based on the comparative example and Example based on Embodiment 1 and the result of this experiment.
FIG. 16 is a sectional view illustrating a secondary battery manufacturing method in Embodiment 2.

As shown in FIG. 16, in the arrangement step, the second collector terminal 20 may be laid on the first collector terminal 10 after the collector foil connection portions 33 are inserted into the slits S1 of the first collector terminal 10. This configuration can produce effects and advantages similar to those of Embodiment 1.

Embodiment 3

Figure 17:
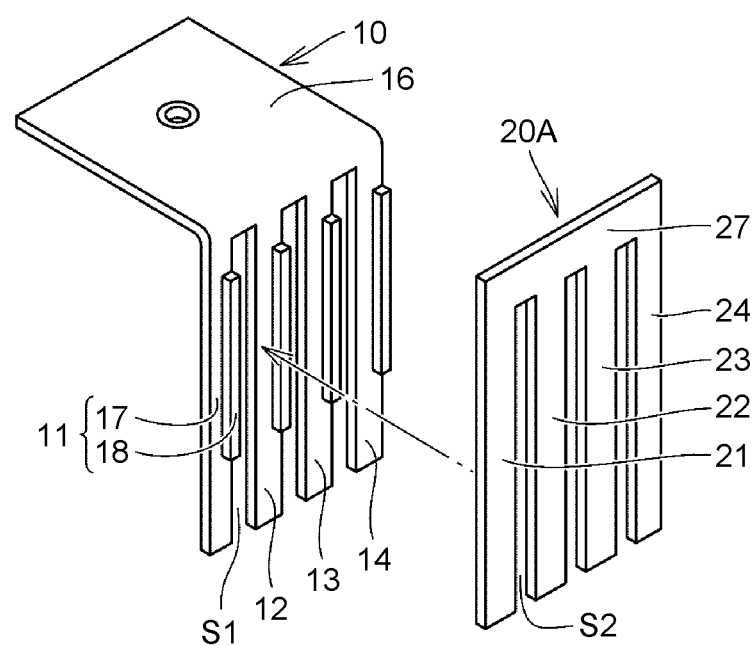
FIG. 17 is a perspective view showing the first collector terminal 10 and a second collector terminal 20A used in a secondary battery and a secondary battery manufacturing method in Embodiment 3.
Figure 18:
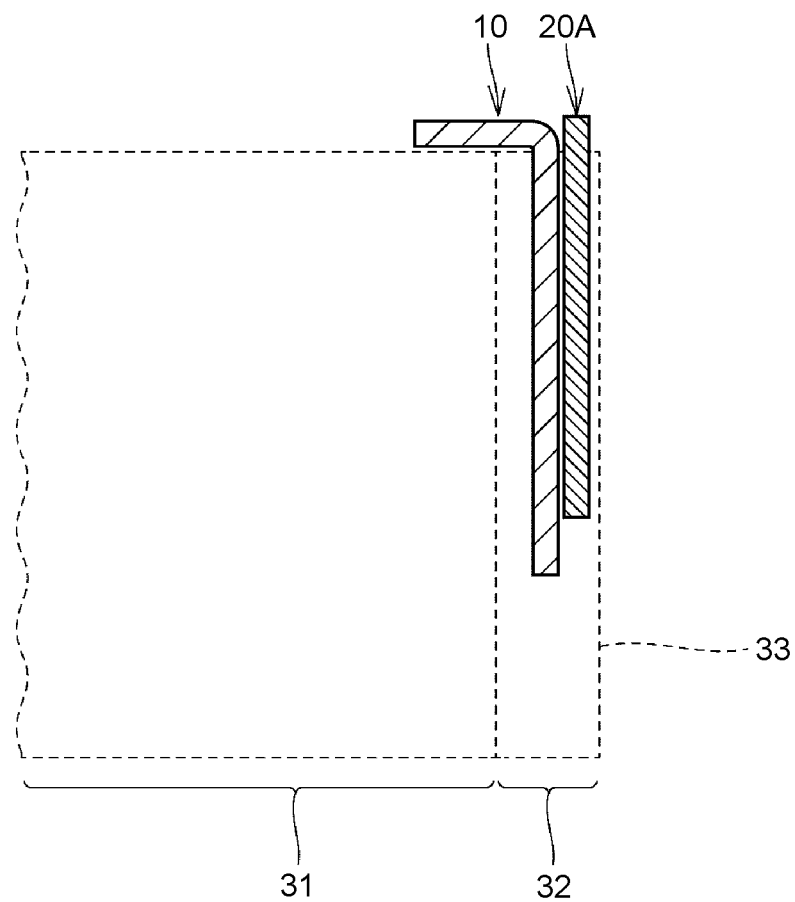
FIG. 18 is a sectional view showing the first collector terminal 10 and the second collector terminal 20A used in the secondary battery and the secondary battery manufacturing method in Embodiment 3.

A secondary battery and a secondary battery manufacturing method in Embodiment 3 will be described with reference to FIG. 17 and FIG. 18. In Embodiment 1, the second collector terminal 20 includes the base part 26 (FIG. 6), and the extension parts 21 to 24 are formed so as to extend from the L-shaped base part 26. A second collector terminal 20A of this embodiment includes a base part 27 having a flat plate shape, and the extension parts 21 to 24 that are formed so as to extend downward from the base part 27. In other words, the base part 27 having a flat plate shape and the extension parts 21 to 24 are flush with each other.

In Embodiment 1, the base part 26 can be used to easily position the second collector terminal 20 on the first collector terminal 10. Even when the second collector terminal 20A is configured as in this embodiment, it is still possible to easily perform welding, for example, by providing as necessary a member that supports or positions the second collector terminal 20A during welding. Thus, Embodiment 3 can produce effects and advantages similar to those of Embodiment 1.

Embodiment 4

Figure 19:
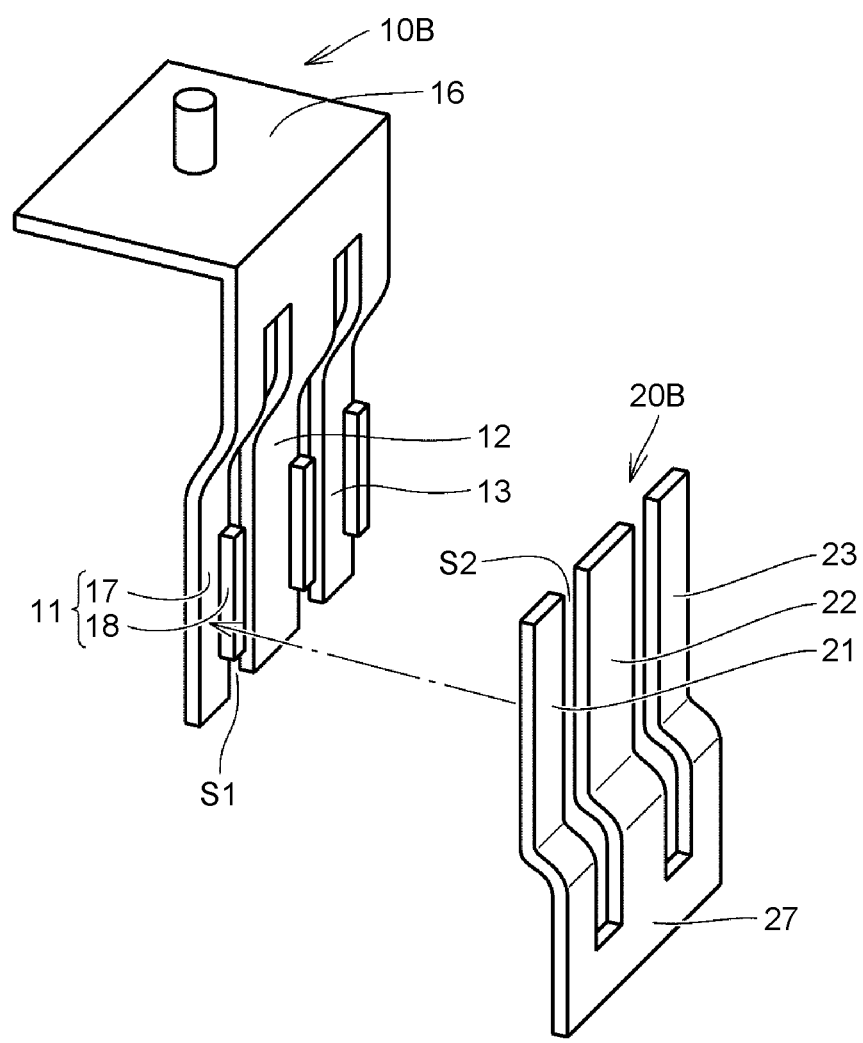
FIG. 19 is a perspective view showing a first collector terminal 10B and a second collector terminal 20B used in a secondary battery and a secondary battery manufacturing method in Embodiment 4.
Figure 20:
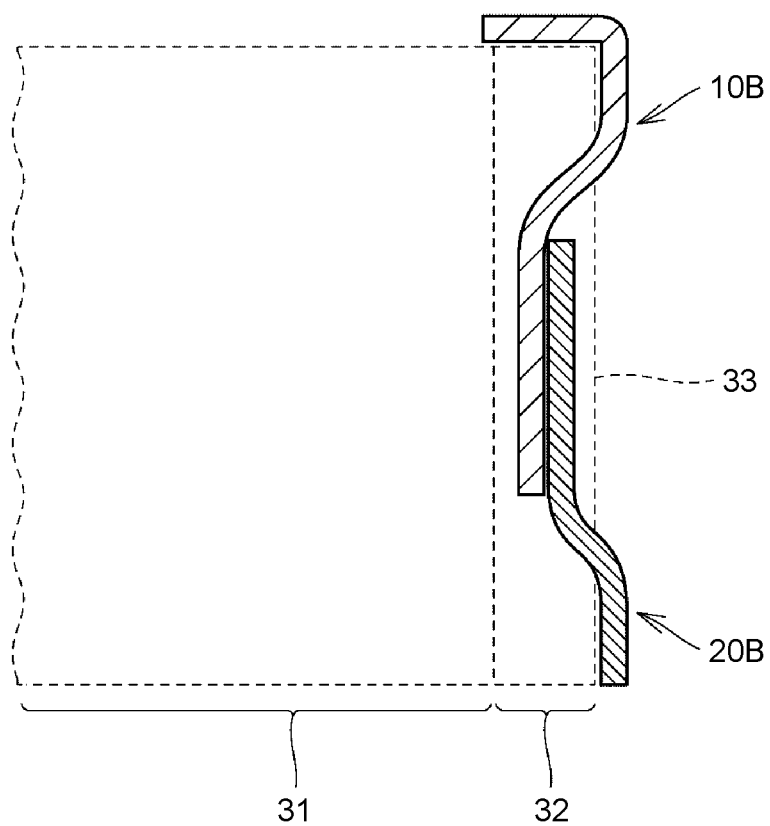
FIG. 20 is a sectional view showing the first collector terminal 10B and the second collector terminal 20B used in the secondary battery and the secondary battery manufacturing method in Embodiment 4.

A secondary battery and a secondary battery manufacturing method in Embodiment 4 will be described with reference to FIG. 19 and FIG. 20. In this embodiment, the flat plate portions 17 of the extension parts 11 to 13 of a first collector terminal 10B are each curved at an intermediate portion in a longitudinal direction thereof, such that lower ends of the extension parts 11 to 13 are located farther on the inside than upper ends thereof. In other words, the extension parts 11 to 13 are curved in the direction from the outside toward the inside of the electrode main body 31 relative to an end of the base part 16 that adjoins the extension parts 11 to 13.

Similarly, the extension parts 21 to 23 of a second collector terminal 20B are each curved at an intermediate portion in a longitudinal direction thereof, such that upper ends of the extension parts 21 to 23 are located farther on the inside than lower ends thereof (portions thereof on the side of the base part 27). In other words, the extension parts 21 to 23 are curved in the direction from the outside toward the inside of the electrode main body 31 relative to an end of the base part 27 that adjoins the extension parts 21 to 23. Even when the welded zones are thus arranged so as to be buried on the inside of the collector foil connection portions 33, effects and advantages similar to those of Embodiment 1 can be produced.

While the embodiments have been described above, the contents disclosed above are not restrictive but merely illustrative in every respect. The technical scope of the present disclosure is defined by the claims, and it is intended that all possible modifications equivalent in meaning and scope to the claims are included in the scope of the present disclosure.

What is claimed is:

1. A secondary battery comprising:
   an electrode main body including a plurality of positive-electrode collector foils and a plurality of negative collector foils having a plurality of separators laminated between;
   wherein the plurality of positive collector foils form at least one positive collector foil protrusion section and at least one positive collector foil connection portion located at a terminal end of the at least one positive collector foil protrusion section;
   the at least one positive collector foil protrusion section protrudes from the electrode main body in a first horizontal direction relative to a top surface of the secondary battery;
   wherein the plurality of negative collector foils form at least one negative collector foil protrusion section and at least one negative collector foil connection portion located at a terminal end of the at least one negative collector foil protrusion section;
   the at least one negative collector foil protrusion section protrudes from the electrode main body in a second horizontal direction on an opposite side on the secondary battery from the first horizontal direction;
   a first collector terminal including a plurality of first extension parts, the first collector terminal extending along either the at least one positive collector foil protrusion section or the at least one negative collector foil protrusion section in a vertical direction orthogonal to the first and second horizontal directions;
   a second collector terminal separate from the first collector terminal, the second collector terminal including a plurality of second extension parts connected to either the at least one positive collector foil connection part or the at least one negative collector foil connection part, the second collector terminal extending in the vertical direction;
   pairs of first extension parts and second extension parts being located on opposite sides of a single positive collector foil connection portion of the at least one positive collector foil connection portion or a single negative collector foil connection portion of the at least one negative collector foil connection portion;
   the secondary battery includes a welded joint which welds each pair of first extension parts and second extension parts to their respective positive or negative foil connection portions
   such that the first collector terminal and the second collector terminal are united through the welded joint.

2. The secondary battery according to claim 1, wherein the at least one positive collector foil connection portion each includes a plurality of positive collector foils, and
   wherein the at least one negative collector foil connection portion each includes a plurality of negative collector foils.

3. The secondary battery according to claim 1, wherein the plurality of first extension parts include a first extension portion and a second extension portion separated from the first extension portion by a clearance;
   the single positive collector foil connection portion or single negative collector foil connection portion passes through the clearance in the first or second horizontal direction;
   the first extension portion includes a flat plate shape extending in the vertical direction;
   and has a first end on a side in contact with the single positive collector foil connection portion or single negative collector foil portion and a protrusion which projects from the flat plate shape in the first or second horizontal direction;
   the plurality of second extension parts are arranged on a first outer surface of the first extension part, the first outer surface opposite a surface of the second extension portion facing the electrode main body;
   each of the plurality of second extension parts includes a second end, the second end contacts the single positive collector foil connection portion or single negative collector foil connection portion; and
   the single positive collector foil connection portion or single negative collector foil connection portion and the protrusion are united by the welded joint.

4. The secondary battery according to claim 3, wherein each of the plurality of second extension parts includes a second outer surface that is a surface of each of the plurality of second extension parts opposite a surface of each of the plurality of second extension parts facing the electrode main body,
   the protrusion includes a third outer surface that is a surface of the protrusion opposite a surface of the protrusion facing the electrode main body, and
   the second outer surface and the third outer surface are flush with each other.

5. The secondary battery according to claim 1, wherein the first collector terminal and the second collector terminal are made of the same type of metal.

6. The secondary battery according to claim 1, wherein the first collector terminal includes an L-shaped first base part from which the plurality of first extension parts extend, and
   the second collector terminal includes an L-shaped second base part from which the plurality of second extension parts extend.

7. The secondary battery according to claim 1, wherein
the first collector terminal includes an L-shaped first base part from which the plurality of first extension parts extend, and
the second collector terminal includes a second base part including a flat plate shape from which the plurality of second extension parts extend, and
a surface of each of the plurality of second extension parts opposite a surface of each of the plurality of second extension parts facing the electrode main body and a surface of the second base part opposite a surface of the second base part facing the electrode main body are flush with each other.

8. The secondary battery according to claim 1, wherein
the plurality of first extension parts extend from a first base part of the first collector terminal along the vertical direction, and the plurality of first extension parts is bent in a direction from the outside toward an inside of the electrode main body relative to an end of the first base part that adjoins the plurality of first extension parts, and
the plurality of second extension parts extend from a second base part of the second collector terminal along the vertical direction, and the plurality of second extension parts is bent in the direction from the outside toward the inside of the electrode main body relative to an end of the second base part that adjoins the plurality of second extension parts.

9. The secondary battery according to claim 1, wherein the plurality of first extension parts and second extension parts are aligned to be planar in the vertical direction at an exterior surface of the secondary battery and are disposed in an alternating configuration along the exterior surface in a third horizontal direction orthogonal to the first and second horizontal directions.

10. A secondary battery manufacturing method comprising:
preparing an electrode main body including a plurality of positive-electrode collector foils and a plurality of negative-electrode collector foils having a plurality of separators laminated between;
wherein the plurality of positive collector foils form at least one positive collector foil protrusion section and at least one positive collector foil connection portion located at a terminal end of the at least one positive collector foil protrusion section;
the at least one positive collector foil protrusion section protrudes from the electrode main body in a first horizontal direction relative to a top surface of the secondary battery;
wherein the plurality of negative collector foils form at least one negative collector foil protrusion section and at least one negative collector foil connection portion located at a terminal end of the at least one negative collector foil protrusion section;
the at least one negative collector foil protrusion section protrudes from the electrode main body in a second horizontal direction on an opposite side on the secondary battery from the first horizontal direction;
preparing a first collector terminal and a second collector terminal that is a member separate from the first collector terminal, the first collector terminal including a plurality of first extension parts;
the first collector terminal extending along either the at least one positive collector foil protrusion section or the at least one negative collector foil protrusion section in a vertical direction orthogonal to the first and second horizontal directions;
the second collector terminal including a plurality of second extension parts connected to either the at least one positive collector foil connection part or the at least one negative collector foil connection part, the second collector terminal extending in the vertical direction;
arranging pairs of first extension parts and second extension parts on opposite sides of a single positive collector foil connection portion of the at least one positive collector foil connection portion or a single negative collector foil connection portion of the at least one negative collector foil connection portion; and
performing laser welding in a state where each pair of first extension parts and second extension parts to their respective positive or negative foil connection portions such that the first collector terminal and second collector terminal are united through the welded joint.

11. The secondary battery manufacturing method according to claim 10, wherein at least one positive collector foil connection portion each includes a plurality of positive collector foils, and
wherein the at least one negative collector foil connection portion each includes a plurality of negative collector foils.

12. The secondary battery manufacturing method according to claim 10, wherein
the first collector terminal includes a first extension portion and a second extension portion separated from the first extension portion by a clearance,
the first extension portion includes a flat plate shape extending the vertical direction and has
a first end in contact with the single positive collector foil connection portion or single negative collector foil portion and a protrusion which projects from the flat plate shape in the first or second horizontal direction,
arranging the first collector terminal and the second collector terminal includes forming a slit between the plurality of second extension parts and the protrusion by arranging the plurality of second extension parts on a first outer surface of the first extension part, the first outer surface opposite a surface of the second extension portion facing the electrode main body, and then arranging the first collector terminal and the second collector terminal such that the single positive collector foil connection portion passes through the slit in the first or second horizontal direction, and
in performing the laser welding, the laser welding is performed in a state where the single positive collector foil connection portion or single negative foil connection portion and the protrusion are united.

13. The secondary battery manufacturing method according to claim 12, wherein
each of the plurality of second extension parts includes a second outer surface that is a surface of each of the plurality of second extension parts opposite from a surface of each of the plurality of second extension parts facing the electrode main body,
the protrusion includes a third outer surface that is a surface of the protrusion opposite a surface facing the electrode main body, and
during performing the laser welding, the second outer surface and the third outer surface are flush with each other.

14. The secondary battery manufacturing method according to claim 10, wherein the first collector terminal includes a first extension portion and a second extension portion separated from the first extension portion by a clearance, the first extension portion includes a flat plate shape extending in the vertical direction and has a first end in contact with the single positive collector foil connection portion that or single negative collector foil portion and a protrusion which projects from the first end in the first or second horizontal direction, arranging the first collector terminal and the second collector terminal includes inserting the single positive collector foil connection portion to pass through the clearance in the first or second horizontal direction, and then arranging the plurality of second extension parts on a first outer surface that is a surface of the first extension portion opposite a surface of the second extension portion facing the electrode main body, such that the single positive collector foil connection portion is arranged between the plurality of second extension parts and the protrusion, and in performing the laser welding, the laser welding is performed in a state where both the protrusion and a second end of the plurality of second extension parts in contact with the single positive collector foil connection portion are in contact with the single positive collector foil connection portion, and the second end, the one of the collector foil connection portions, and the protrusion are united as the welded joint is formed.

\* \* \* \* \*